US012023853B2

(12) United States Patent
Krishnan et al.

(10) Patent No.: US 12,023,853 B2
(45) Date of Patent: Jul. 2, 2024

(54) POLISHING ARTICLES AND INTEGRATED SYSTEM AND METHODS FOR MANUFACTURING CHEMICAL MECHANICAL POLISHING ARTICLES

(71) Applicant: Applied Materials, Inc., Santa Clara, CA (US)

(72) Inventors: Kasiraman Krishnan, Milpitas, CA (US); Daniel Redfield, Morgan Hill, CA (US); Russell Edward Perry, Pleasanton, CA (US); Gregory E. Menk, Pleasanton, CA (US); Rajeev Bajaj, Fremont, CA (US); Fred C. Redeker, Fremont, CA (US); Nag B. Patibandla, Pleasanton, CA (US); Mahendra C. Orilall, Downingtown, PA (US); Jason G. Fung, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1247 days.

(21) Appl. No.: 16/700,062

(22) Filed: Dec. 2, 2019

(65) Prior Publication Data
US 2020/0101657 A1 Apr. 2, 2020

Related U.S. Application Data

(63) Continuation of application No. 15/722,810, filed on Oct. 2, 2017, now Pat. No. 10,493,691, which is a
(Continued)

(51) Int. Cl.
*B29C 64/112* (2017.01)
*B24B 37/22* (2012.01)
(Continued)

(52) U.S. Cl.
CPC ........... *B29C 64/112* (2017.08); *B24B 37/22* (2013.01); *B24B 37/24* (2013.01); *B24B 37/26* (2013.01);
(Continued)

(58) Field of Classification Search
CPC ....... B29C 64/112; B24B 37/22; B24B 37/24; B24B 37/26; B24D 11/001; B24D 3/28;
(Continued)

(56) References Cited

U.S. PATENT DOCUMENTS 2,001,911 A 5/1935 Wooddell et al.
3,357,598 A 12/1967 Kraft
(Continued)

FOREIGN PATENT DOCUMENTS

CN 1345264 A 4/2002
CN 1484566 A 3/2004
(Continued)

OTHER PUBLICATIONS

Decision to Grant (and English Translation) for JP Patent Application No. 2017-520353, dated Aug. 19, 2020, 5 pages.
(Continued)

*Primary Examiner* — Joel D Crandall
(74) *Attorney, Agent, or Firm* — Patterson + Sheridan, LLP

(57) ABSTRACT

A polishing article manufacturing system includes a feed section and a take-up section, the take-up section comprising a supply roll having a polishing article disposed thereon for a chemical mechanical polishing process, a print section comprising a plurality of printheads disposed between the feed section and the take-up section, and a curing section disposed between the feed section and the take-up section, the curing section comprising one or both of a thermal curing device and an electromagnetic curing device.

18 Claims, 8 Drawing Sheets

Related U.S. Application Data continuation of application No. 14/863,409, filed on Sep. 23, 2015, now Pat. No. 9,776,361.

(60) Provisional application No. 62/065,533, filed on Oct. 17, 2014.

(51) Int. Cl.
  *B24B 37/24* (2012.01)
  *B24B 37/26* (2012.01)
  *B24D 11/00* (2006.01)
  *B29K 105/16* (2006.01)
  *B29L 31/00* (2006.01)

(52) U.S. Cl.
  CPC ........ *B24D 11/001* (2013.01); *B29K 2105/16* (2013.01); *B29K 2995/007* (2013.01); *B29L 2031/736* (2013.01)

(58) Field of Classification Search
  CPC ........ B24D 3/30; B24D 3/32; B24D 18/0045; B24D 18/009
  See application file for complete search history.

(56) References Cited

U.S. PATENT DOCUMENTS

| | | |
|---|---|---|
| 3,741,116 A | 6/1973 | Green et al. |
| 4,459,779 A | 7/1984 | Shen |
| 4,575,330 A | 3/1986 | Hull |
| 4,836,832 A | 6/1989 | Tumey et al. |
| 4,841,680 A | 6/1989 | Hoffstein et al. |
| 4,844,144 A | 7/1989 | Murphy et al. |
| 4,942,001 A | 7/1990 | Murphy et al. |
| 4,960,673 A | 10/1990 | Beck et al. |
| 5,096,530 A | 3/1992 | Cohen |
| 5,120,476 A | 6/1992 | Scholz |
| 5,121,329 A | 6/1992 | Crump |
| 5,178,646 A | 1/1993 | Barber, Jr. et al. |
| 5,193,316 A | 3/1993 | Olmstead |
| 5,212,910 A | 5/1993 | Breivogel et al. |
| 5,287,663 A | 2/1994 | Pierce et al. |
| 5,300,417 A | 4/1994 | Lushington et al. |
| 5,378,527 A | 1/1995 | Nakanishi et al. |
| 5,387,380 A | 2/1995 | Cima et al. |
| 5,470,368 A | 11/1995 | Culler |
| 5,533,923 A | 7/1996 | Shamouilian et al. |
| 5,605,499 A | 2/1997 | Sugiyama et al. |
| 5,605,760 A | 2/1997 | Roberts |
| 5,609,517 A | 3/1997 | Lofaro |
| 5,624,303 A | 4/1997 | Robinson |
| 5,626,919 A | 5/1997 | Chapman et al. |
| 5,645,471 A | 7/1997 | Strecker |
| 5,664,986 A | 9/1997 | Roh |
| 5,690,540 A | 11/1997 | Elliott et al. |
| 5,738,574 A | 4/1998 | Tolles et al. |
| 5,748,434 A | 5/1998 | Rossman et al. |
| 5,778,481 A | 7/1998 | Amsden et al. |
| 5,795,218 A | 8/1998 | Poan et al. |
| 5,876,268 A | 3/1999 | Lamphere et al. |
| 5,876,490 A | 3/1999 | Ronay |
| 5,888,121 A | 3/1999 | Kirchner et al. |
| 5,900,164 A | 5/1999 | Budinger et al. |
| 5,905,099 A | 5/1999 | Everaerts et al. |
| 5,906,863 A | 5/1999 | Lombardi et al. |
| 5,910,471 A | 6/1999 | Christianson et al. |
| 5,919,082 A | 7/1999 | Walker et al. |
| 5,921,855 A | 7/1999 | Osterheld et al. |
| 5,932,040 A | 8/1999 | Audisio |
| 5,932,290 A | 8/1999 | Lombardi et al. |
| 5,940,674 A | 8/1999 | Sachs et al. |
| 5,944,583 A | 8/1999 | Cruz et al. |
| 5,951,380 A | 9/1999 | Kim |
| 5,965,460 A | 10/1999 | Rach et al. |
| 5,976,000 A | 11/1999 | Hudson |
| 5,984,769 A | 11/1999 | Bennett et al. |
| 5,989,111 A | 11/1999 | Lamphere et al. |
| 5,989,470 A | 11/1999 | Poan et al. |
| 6,017,609 A | 1/2000 | Akamatsu et al. |
| 6,022,264 A | 2/2000 | Cook et al. |
| 6,029,096 A | 2/2000 | Manners et al. |
| 6,036,579 A | 3/2000 | Cook et al. |
| 6,039,836 A | 3/2000 | Dhindsa et al. |
| 6,062,968 A | 5/2000 | Sevilla et al. |
| 6,077,581 A | 6/2000 | Kuramochi et al. |
| 6,090,475 A | 7/2000 | Robinson et al. |
| 6,095,084 A | 8/2000 | Shamouilian et al. |
| 6,095,902 A | 8/2000 | Reinhardt |
| 6,117,000 A | 9/2000 | Anjur et al. |
| 6,121,143 A | 9/2000 | Messner et al. |
| 6,122,564 A | 9/2000 | Koch et al. |
| 6,126,532 A | 10/2000 | Sevilla et al. |
| 6,155,910 A | 12/2000 | Lamphere et al. |
| 6,176,992 B1 | 1/2001 | Talieh |
| 6,201,208 B1 | 3/2001 | Wendt et al. |
| 6,206,759 B1 | 3/2001 | Agarwal et al. |
| 6,210,254 B1 | 4/2001 | Cook et al. |
| 6,213,845 B1 | 4/2001 | Elledge |
| 6,228,133 B1 | 5/2001 | Thurber et al. |
| 6,231,629 B1 | 5/2001 | Christianson et al. |
| 6,231,942 B1 | 5/2001 | Blizard et al. |
| 6,232,236 B1 | 5/2001 | Shan et al. |
| 6,241,596 B1 | 6/2001 | Osterheld et al. |
| 6,254,460 B1 | 7/2001 | Walker et al. |
| 6,257,973 B1 | 7/2001 | Fernand Guiselin |
| 6,267,641 B1 | 7/2001 | Vanell et al. |
| 6,273,806 B1 | 8/2001 | Bennett et al. |
| 6,309,276 B1 | 10/2001 | Tsai et al. |
| 6,309,282 B1 | 10/2001 | Wright et al. |
| 6,319,108 B1 | 11/2001 | Adefris et al. |
| 6,322,728 B1 | 11/2001 | Brodkin et al. |
| 6,325,706 B1 | 12/2001 | Krusell et al. |
| 6,328,634 B1 | 12/2001 | Shen et al. |
| 6,332,832 B1 | 12/2001 | Suzuki |
| 6,338,901 B1 | 1/2002 | Veerasamy |
| 6,361,411 B1 | 3/2002 | Chopra et al. |
| 6,361,832 B1 | 3/2002 | Agarwal et al. |
| 6,368,184 B1 | 4/2002 | Beckage |
| 6,390,890 B1 | 5/2002 | Molnar |
| 6,399,501 B2 | 6/2002 | Birang et al. |
| 6,402,604 B2 | 6/2002 | Guiselin |
| 6,407,669 B1 | 6/2002 | Brown et al. |
| 6,423,255 B1 | 7/2002 | Hoechsmann et al. |
| 6,428,586 B1 | 8/2002 | Yancey |
| 6,454,634 B1 | 9/2002 | James et al. |
| 6,477,926 B1 | 11/2002 | Swisher et al. |
| 6,488,570 B1 | 12/2002 | James et al. |
| 6,500,053 B2 | 12/2002 | James et al. |
| 6,506,097 B1 | 1/2003 | Adams et al. |
| 6,518,162 B2 | 2/2003 | Ono et al. |
| 6,520,834 B1 | 2/2003 | Marshall |
| 6,520,847 B2 | 2/2003 | Osterheld et al. |
| 6,544,373 B2 | 4/2003 | Chen et al. |
| 6,548,407 B1 | 4/2003 | Chopra et al. |
| 6,569,373 B2 | 5/2003 | Napadensky |
| 6,582,283 B2 | 6/2003 | James et al. |
| 6,585,563 B1 | 7/2003 | Redeker et al. |
| 6,586,494 B2 | 7/2003 | Mejiritski et al. |
| 6,592,443 B1 | 7/2003 | Kramer et al. |
| 6,641,463 B1 | 11/2003 | Molnar |
| 6,641,471 B1 | 11/2003 | Pinheiro et al. |
| 6,645,061 B1 | 11/2003 | Bennett et al. |
| 6,682,402 B1 | 1/2004 | Roberts et al. |
| 6,684,704 B1 | 2/2004 | Obeng |
| 6,685,548 B2 | 2/2004 | Chen et al. |
| 6,692,338 B1 | 2/2004 | Kirchner |
| 6,699,115 B2 | 3/2004 | Osterheld et al. |
| 6,719,818 B1 | 4/2004 | Birang et al. |
| 6,736,709 B1 | 5/2004 | James et al. |
| 6,736,714 B2 | 5/2004 | Dudovicz |
| 6,746,225 B1 | 6/2004 | McHugh |
| 6,746,311 B1 | 6/2004 | Kessel |
| 6,749,485 B1 | 6/2004 | James et al. |
| 6,749,714 B1 | 6/2004 | Ishikawa et al. |

(56) References Cited

U.S. PATENT DOCUMENTS

| | | |
|---|---|---|
| 6,773,474 B2 | 8/2004 | Koehnle et al. |
| 6,783,436 B1 | 8/2004 | Muldowney |
| 6,790,883 B2 | 9/2004 | Ogawa et al. |
| 6,796,880 B2 | 9/2004 | Redeker et al. |
| 6,811,680 B2 | 11/2004 | Chen et al. |
| 6,811,937 B2 | 11/2004 | Lawton |
| 6,815,570 B1 | 11/2004 | Negiz et al. |
| 6,833,046 B2 | 12/2004 | Wright |
| 6,838,149 B2 | 1/2005 | Lugg |
| 6,840,843 B2 | 1/2005 | Jones et al. |
| 6,843,711 B1 | 1/2005 | Muldowney |
| 6,847,014 B1 | 1/2005 | Benjamin et al. |
| 6,855,588 B1 | 2/2005 | Liao et al. |
| 6,860,793 B2 | 3/2005 | Budinger et al. |
| 6,860,802 B1 | 3/2005 | Vishwanathan et al. |
| 6,866,807 B2 | 3/2005 | Comb et al. |
| 6,869,350 B2 | 3/2005 | Roberts et al. |
| 6,875,096 B2 | 4/2005 | Park et al. |
| 6,875,097 B2 | 4/2005 | Grunwald |
| 6,887,137 B2 | 5/2005 | Lee et al. |
| 6,896,593 B2 | 5/2005 | Prasad |
| 6,896,765 B2 | 5/2005 | Steger |
| 6,913,517 B2 | 7/2005 | Prasad |
| 6,935,931 B2 | 8/2005 | Prasad |
| 6,950,193 B1 | 9/2005 | Discenzo |
| 6,955,588 B1 | 10/2005 | Anderson, II et al. |
| 6,984,163 B2 | 1/2006 | Roberts |
| 6,991,517 B2 | 1/2006 | Redeker et al. |
| 6,991,528 B2 | 1/2006 | Hu et al. |
| 6,998,166 B2 | 2/2006 | Prasad |
| 7,018,560 B2 | 3/2006 | Liu et al. |
| 7,029,747 B2 | 4/2006 | Huh et al. |
| 7,044,836 B2 | 5/2006 | Sun et al. |
| 7,059,949 B1 | 6/2006 | Elmufdi et al. |
| 7,059,950 B1 | 6/2006 | Muldowney |
| 7,077,879 B2 | 7/2006 | Ogawa et al. |
| 7,120,512 B2 | 10/2006 | Kramer et al. |
| 7,125,318 B2 | 10/2006 | Muldowney |
| 7,132,033 B2 | 11/2006 | Boldizar et al. |
| 7,166,017 B2 | 1/2007 | Minamihaba et al. |
| 7,169,030 B1 | 1/2007 | Kulp |
| 7,186,164 B2 | 3/2007 | Manens |
| 7,186,322 B2 | 3/2007 | Sato et al. |
| 7,192,336 B2 | 3/2007 | Kramer et al. |
| 7,195,544 B2 | 3/2007 | Prasad |
| 7,204,742 B2 | 4/2007 | Prasad |
| 7,234,224 B1 | 6/2007 | Naugler et al. |
| 7,252,871 B2 | 8/2007 | Crkvenac et al. |
| 7,264,641 B2 | 9/2007 | Prasad |
| 7,267,607 B2 | 9/2007 | Prasad |
| 7,267,610 B1 | 9/2007 | Elmufdi et al. |
| 7,268,173 B2 | 9/2007 | Graichen et al. |
| 7,300,340 B1 | 11/2007 | Elmufdi et al. |
| 7,300,619 B2 | 11/2007 | Napadensky et al. |
| 7,311,590 B1 | 12/2007 | Muldowney |
| 7,311,862 B2 | 12/2007 | Prasad |
| 7,332,104 B2 | 2/2008 | Minamihaba et al. |
| 7,357,698 B2 | 4/2008 | Choi |
| 7,371,160 B1 | 5/2008 | Cruz et al. |
| 7,377,840 B2 | 5/2008 | Deopura et al. |
| 7,382,959 B1 | 6/2008 | Jacobsen |
| 7,425,172 B2 | 9/2008 | Misra et al. |
| 7,425,250 B2 | 9/2008 | Basol et al. |
| 7,427,340 B2 | 9/2008 | Mavliev et al. |
| 7,435,161 B2 | 10/2008 | Prasad et al. |
| 7,435,165 B2 | 10/2008 | Prasad |
| 7,438,636 B2 | 10/2008 | Kulp et al. |
| 7,438,795 B2 | 10/2008 | Wylie et al. |
| 7,445,847 B2 | 11/2008 | Kulp |
| 7,455,571 B1 | 11/2008 | Kuo et al. |
| 7,497,885 B2 | 3/2009 | Kollodge |
| 7,513,818 B2 | 4/2009 | Miller et al. |
| 7,517,277 B2 | 4/2009 | Muldowney |
| 7,517,488 B2 | 4/2009 | Saikin |
| 7,520,798 B2 | 4/2009 | Muldowney |
| 7,524,345 B2 | 4/2009 | Nevoret et al. |
| 7,530,880 B2 | 5/2009 | Bajaj et al. |
| 7,531,117 B2 | 5/2009 | Ederer et al. |
| 7,537,446 B2 | 5/2009 | James et al. |
| 7,582,127 B2 | 9/2009 | Vacassy et al. |
| 7,635,290 B2 | 12/2009 | Muldowney |
| 7,648,645 B2 | 1/2010 | Roberts et al. |
| 7,652,286 B2 | 1/2010 | Isobe et al. |
| 7,699,684 B2 | 4/2010 | Prasad |
| 7,704,122 B2 | 4/2010 | Misra et al. |
| 7,704,125 B2 | 4/2010 | Roy et al. |
| 7,731,568 B2 | 6/2010 | Shimomura et al. |
| 7,754,118 B2 | 7/2010 | Huh et al. |
| 7,758,764 B2 | 7/2010 | Dhindsa et al. |
| 7,762,870 B2 | 7/2010 | Ono et al. |
| 7,815,778 B2 | 10/2010 | Bajaj |
| 7,828,634 B2 | 11/2010 | Jiang et al. |
| 7,840,305 B2 | 11/2010 | Behr et al. |
| 7,846,008 B2 | 12/2010 | Bajaj |
| 7,871,309 B2 | 1/2011 | Ogawa et al. |
| 7,875,091 B2 | 1/2011 | Nevorct et al. |
| 7,926,521 B2 | 4/2011 | Zumoto et al. |
| 7,935,276 B2 | 5/2011 | Zhou et al. |
| 7,943,681 B2 | 5/2011 | Lee et al. |
| 7,976,901 B2 | 7/2011 | Kume et al. |
| 8,047,899 B2 | 11/2011 | Chen et al. |
| 8,053,487 B2 | 11/2011 | Ragain, Jr. et al. |
| 8,057,282 B2 | 11/2011 | Muldowney |
| 8,062,102 B2 | 11/2011 | Park et al. |
| 8,062,103 B2 | 11/2011 | Muldowney |
| 8,066,555 B2 | 11/2011 | Bajaj |
| 8,067,814 B2 | 11/2011 | Takehara et al. |
| 8,075,372 B2 | 12/2011 | Prasad |
| 8,075,745 B2 | 12/2011 | Bajaj |
| 8,083,820 B2 | 12/2011 | Kollodge et al. |
| 8,111,603 B2 | 2/2012 | Nishimura et al. |
| 8,118,641 B2 | 2/2012 | Kulp et al. |
| 8,142,860 B2 | 3/2012 | Vanmaele et al. |
| 8,142,869 B2 | 3/2012 | Kobayashi et al. |
| 8,172,648 B2 | 5/2012 | Lefevre et al. |
| 8,177,603 B2 | 5/2012 | Bajaj |
| 8,211,324 B2 | 7/2012 | Dhindsa et al. |
| 8,211,543 B2 | 7/2012 | Kato et al. |
| 8,257,545 B2 | 9/2012 | Loyack et al. |
| 8,260,447 B2 | 9/2012 | Mattes et al. |
| 8,282,866 B2 | 10/2012 | Hiraide |
| 8,287,793 B2 | 10/2012 | Deopura et al. |
| 8,288,448 B2 | 10/2012 | Kulp |
| 8,292,592 B2 | 10/2012 | Welch et al. |
| 8,292,692 B2 | 10/2012 | Bajaj |
| 8,337,282 B2 | 12/2012 | Park et al. |
| 8,349,706 B2 | 1/2013 | Noda |
| 8,377,623 B2 | 2/2013 | Fong |
| 8,380,339 B2 | 2/2013 | Misra et al. |
| 8,388,410 B2 | 3/2013 | Albright, Jr. |
| 8,393,934 B2 | 3/2013 | Sung |
| 8,398,461 B2 | 3/2013 | Wang |
| 8,398,466 B2 | 3/2013 | Sung et al. |
| 8,409,976 B2 | 4/2013 | Hieslmair |
| 8,444,890 B2 | 5/2013 | Drury |
| 8,545,292 B2 | 10/2013 | Shinchi et al. |
| 8,546,717 B2 | 10/2013 | Stecker |
| 8,562,389 B2 | 10/2013 | Benvegnu et al. |
| 8,563,619 B2 | 10/2013 | Dhindsa et al. |
| 8,598,523 B2 | 12/2013 | Stecker et al. |
| 8,602,851 B2 | 12/2013 | Lombardo et al. |
| 8,647,179 B2 | 2/2014 | Nakayama et al. |
| 8,673,166 B2 | 3/2014 | Okita et al. |
| 8,676,537 B2 | 3/2014 | Liu et al. |
| 8,684,794 B2 | 4/2014 | Lefevre et al. |
| 8,690,978 B2 | 4/2014 | Arnaud et al. |
| 8,702,479 B2 | 4/2014 | Huang et al. |
| 8,709,114 B2 | 4/2014 | Cantrell et al. |
| 8,712,571 B2 | 4/2014 | Liu et al. |
| 8,715,035 B2 | 5/2014 | Roy et al. |
| 8,734,206 B2 | 5/2014 | Chang et al. |
| 8,734,664 B2 | 5/2014 | Yang et al. |
| 8,784,721 B2 | 7/2014 | Philippi et al. |
| 8,801,949 B2 | 8/2014 | Lakrout et al. |

(56) References Cited

U.S. PATENT DOCUMENTS

| | | |
|---|---|---|
| 8,821,214 B2 | 9/2014 | Joseph |
| 8,845,852 B2 | 9/2014 | Nakamori et al. |
| 8,853,082 B2 | 10/2014 | Hanano et al. |
| 8,853,527 B2 | 10/2014 | Hieslmair |
| 8,864,859 B2 | 10/2014 | Roy et al. |
| 8,883,392 B2 | 11/2014 | Napadensky et al. |
| 8,888,480 B2 | 11/2014 | Yoo et al. |
| 8,894,799 B2 | 11/2014 | Lakrout |
| 8,932,116 B2 | 1/2015 | Deopura et al. |
| 8,932,511 B2 | 1/2015 | Napadensky |
| 8,968,058 B2 | 3/2015 | Kerprich et al. |
| 8,980,749 B1 | 3/2015 | Itai et al. |
| 8,986,585 B2 | 3/2015 | Cantrell et al. |
| 8,988,848 B2 | 3/2015 | Todorow et al. |
| 9,017,140 B2 | 4/2015 | Allison et al. |
| 9,033,764 B2 | 5/2015 | Kitamura et al. |
| 9,053,908 B2 | 6/2015 | Sriraman et al. |
| 9,067,297 B2 | 6/2015 | Allison et al. |
| 9,067,298 B2 | 6/2015 | Lefevre et al. |
| 9,067,299 B2 | 6/2015 | Bajaj et al. |
| 9,068,085 B2 | 6/2015 | Kim et al. |
| 9,089,943 B2 | 7/2015 | Lipson |
| 9,108,291 B2 | 8/2015 | Lakrout |
| 9,126,304 B2 | 9/2015 | Kimura |
| 9,138,858 B2 | 9/2015 | Benvegnu et al. |
| 9,152,006 B2 | 10/2015 | Farrand et al. |
| 9,152,340 B2 | 10/2015 | Wu et al. |
| 9,156,124 B2 | 10/2015 | Allison et al. |
| 9,162,340 B2 | 10/2015 | Joseph et al. |
| 9,162,341 B2 | 10/2015 | LeFevre et al. |
| 9,211,628 B2 | 12/2015 | Allison et al. |
| 9,216,546 B2 | 12/2015 | DeSimone et al. |
| 9,254,545 B2 | 2/2016 | Park |
| 9,259,820 B2 | 2/2016 | Qian et al. |
| 9,259,821 B2 | 2/2016 | Qian et al. |
| 9,278,424 B2 | 3/2016 | Roy et al. |
| 9,296,085 B2 | 3/2016 | Bajaj et al. |
| 9,308,620 B2 | 4/2016 | Schutte et al. |
| 9,314,897 B2 | 4/2016 | Qian et al. |
| 9,333,620 B2 | 5/2016 | Qian et al. |
| 9,352,443 B2 | 5/2016 | Suen et al. |
| 9,375,821 B2 | 6/2016 | Chen et al. |
| 9,375,822 B2 | 6/2016 | Hsu et al. |
| 9,393,740 B2 | 7/2016 | Okamoto et al. |
| 9,421,666 B2 | 8/2016 | Krishnan et al. |
| 9,425,121 B2 | 8/2016 | Tsai et al. |
| 9,457,520 B2 | 10/2016 | Bajaj et al. |
| 9,469,800 B2 | 10/2016 | Jung |
| 9,472,410 B2 | 10/2016 | Sadjadi et al. |
| 9,481,069 B2 | 11/2016 | Chen et al. |
| 9,505,952 B2 | 11/2016 | Reiss et al. |
| 9,536,711 B2 | 1/2017 | Dhindsa et al. |
| 9,536,769 B1 | 1/2017 | Sadjadi et al. |
| 9,583,357 B2 | 2/2017 | Long et al. |
| 9,587,127 B2 | 3/2017 | Herlihy et al. |
| 9,601,319 B1 | 3/2017 | Bravo et al. |
| 9,620,376 B2 | 4/2017 | Kamp et al. |
| 9,630,249 B2 | 4/2017 | Toyserkani et al. |
| 9,669,512 B2 | 6/2017 | Bajaj et al. |
| 9,718,129 B2 | 8/2017 | Ljungblad et al. |
| 9,735,037 B2 | 8/2017 | Cox |
| 9,744,724 B2 | 8/2017 | Bajaj et al. |
| 9,761,459 B2 | 9/2017 | Long et al. |
| 9,776,361 B2 | 10/2017 | Krishnan et al. |
| 9,805,965 B2 | 10/2017 | Sadjadi et al. |
| 9,852,889 B1 | 12/2017 | Kellogg et al. |
| 9,868,230 B2 | 1/2018 | Dikovsky et al. |
| 9,873,180 B2 | 1/2018 | Bajaj et al. |
| 9,881,820 B2 | 1/2018 | Wong et al. |
| 9,950,405 B2 | 4/2018 | Deng |
| 9,951,054 B2 | 4/2018 | Li et al. |
| 9,956,314 B2 | 5/2018 | Skaria et al. |
| 9,993,907 B2 | 6/2018 | Murugesh et al. |
| 10,005,236 B2 | 6/2018 | Yudovin-Farber et al. |
| 10,016,877 B2 | 7/2018 | Krishnan et al. |
| 10,029,405 B2 | 7/2018 | Bajaj et al. |
| 10,086,500 B2 | 10/2018 | Orilall et al. |
| 10,115,568 B2 | 10/2018 | Kellogg et al. |
| 10,220,487 B2 | 3/2019 | Roy et al. |
| 10,245,704 B2 | 4/2019 | Eilers et al. |
| 10,322,491 B2 | 6/2019 | Orilall et al. |
| 10,335,994 B2 | 7/2019 | Napadensky et al. |
| 10,347,500 B1 | 7/2019 | Doh et al. |
| 10,384,330 B2 | 8/2019 | Bajaj et al. |
| 10,391,605 B2 | 8/2019 | Ganapathiappan et al. |
| 10,399,201 B2 | 9/2019 | Ganapathiappan et al. |
| 10,406,599 B2 | 9/2019 | Ljungblad et al. |
| 10,406,801 B2 | 9/2019 | Bell et al. |
| 10,456,886 B2 | 10/2019 | Ganapathiappan et al. |
| 10,483,235 B2 | 11/2019 | Chiao et al. |
| 10,493,691 B2 | 12/2019 | Krishnan et al. |
| 10,537,974 B2 | 1/2020 | Bajaj et al. |
| 10,580,657 B2 | 3/2020 | Doh et al. |
| 10,593,574 B2 | 3/2020 | Fung et al. |
| 10,618,141 B2 | 4/2020 | Chockalingam et al. |
| 10,675,789 B2 | 6/2020 | Dikovsky et al. |
| 10,685,862 B2 | 6/2020 | Rogers |
| 10,744,714 B2 | 8/2020 | Lopez et al. |
| 10,763,081 B2 | 9/2020 | Cui et al. |
| 10,773,509 B2 | 9/2020 | Ng et al. |
| 10,821,573 B2 | 11/2020 | Bajaj et al. |
| 10,840,062 B2 | 11/2020 | Nguyen et al. |
| 10,847,347 B2 | 11/2020 | Noorbakhsh et al. |
| 10,875,145 B2 | 12/2020 | Bajaj et al. |
| 10,875,153 B2 | 12/2020 | Bajaj et al. |
| 10,876,073 B2 | 12/2020 | Ishida |
| 10,916,408 B2 | 2/2021 | Dorf et al. |
| 10,919,123 B2 | 2/2021 | Hariharan et al. |
| 10,923,321 B2 | 2/2021 | Dorf et al. |
| 10,953,515 B2 | 3/2021 | Ganapathiappan et al. |
| 2001/0008830 A1 | 7/2001 | Tolles et al. |
| 2001/0019881 A1 | 9/2001 | Ohmoto et al. |
| 2001/0020448 A1 | 9/2001 | Vaartstra et al. |
| 2001/0029151 A1 | 10/2001 | Chopra |
| 2001/0034089 A1 | 10/2001 | Yamazaki et al. |
| 2001/0041511 A1 | 11/2001 | Lack et al. |
| 2001/0046834 A1 | 11/2001 | Ramana et al. |
| 2002/0016139 A1 | 2/2002 | Hirokawa et al. |
| 2002/0058396 A1 | 5/2002 | Roberts et al. |
| 2002/0058468 A1 | 5/2002 | Eppert et al. |
| 2002/0069591 A1 | 6/2002 | Yancey |
| 2002/0077036 A1 | 6/2002 | Roberts et al. |
| 2002/0083577 A1 | 7/2002 | Suzuki |
| 2002/0112632 A1 | 8/2002 | Faibish |
| 2002/0137450 A1 | 9/2002 | Osterheld et al. |
| 2002/0167101 A1* | 11/2002 | Tochimoto ............ B29C 64/112 425/130 |
| 2002/0173248 A1 | 11/2002 | Doan et al. |
| 2003/0019570 A1 | 1/2003 | Chen et al. |
| 2003/0022611 A1 | 1/2003 | Bartlett et al. |
| 2003/0056870 A1 | 3/2003 | Comb et al. |
| 2003/0113509 A1 | 6/2003 | Lugg |
| 2003/0134581 A1 | 7/2003 | Wang et al. |
| 2003/0153253 A1 | 8/2003 | Hanamoto et al. |
| 2003/0153255 A1 | 8/2003 | Hasegawa et al. |
| 2003/0166381 A1 | 9/2003 | Lee et al. |
| 2003/0181137 A1 | 9/2003 | Redeker et al. |
| 2003/0205325 A1 | 11/2003 | Boyd et al. |
| 2003/0220061 A1 | 11/2003 | Prasad |
| 2004/0003895 A1 | 1/2004 | Amano |
| 2004/0014413 A1 | 1/2004 | Kawahashi et al. |
| 2004/0033758 A1 | 2/2004 | Wiswesser |
| 2004/0055223 A1 | 3/2004 | Ono et al. |
| 2004/0058623 A1 | 3/2004 | Lin et al. |
| 2004/0092108 A1 | 5/2004 | Yajima et al. |
| 2004/0106367 A1 | 6/2004 | Walker et al. |
| 2004/0126575 A1 | 7/2004 | Yoshida et al. |
| 2004/0133298 A1 | 7/2004 | Toyserkani et al. |
| 2004/0154533 A1 | 8/2004 | Agarwal et al. |
| 2004/0171340 A1 | 9/2004 | Prasad |
| 2004/0173946 A1 | 9/2004 | Pfeifer et al. |
| 2004/0175451 A1 | 9/2004 | Maekawa et al. |
| 2004/0180611 A1 | 9/2004 | Tajima |
| 2004/0187714 A1 | 9/2004 | Napadensky et al. |

(56) References Cited

U.S. PATENT DOCUMENTS

| | | |
|---|---|---|
| 2004/0198185 A1 | 10/2004 | Redeker et al. |
| 2004/0224616 A1 | 11/2004 | Shiho et al. |
| 2004/0266326 A1 | 12/2004 | Shiho et al. |
| 2005/0003189 A1 | 1/2005 | Bredt et al. |
| 2005/0016868 A1 | 1/2005 | Basol et al. |
| 2005/0020082 A1 | 1/2005 | Vishwanathan et al. |
| 2005/0032464 A1 | 2/2005 | Swisher et al. |
| 2005/0051095 A1 | 3/2005 | Kikuchi et al. |
| 2005/0056622 A1 | 3/2005 | Steger |
| 2005/0062900 A1 | 3/2005 | Kim |
| 2005/0064709 A1 | 3/2005 | Shimomura et al. |
| 2005/0086869 A1 | 4/2005 | Park et al. |
| 2005/0098540 A1 | 5/2005 | Prasad |
| 2005/0101228 A1 | 5/2005 | Prasad |
| 2005/0110853 A1 | 5/2005 | Gardner et al. |
| 2005/0112998 A1 | 5/2005 | Matsuo et al. |
| 2005/0124262 A1 | 6/2005 | Manens |
| 2005/0153634 A1 | 7/2005 | Prasad et al. |
| 2005/0171224 A1 | 8/2005 | Kulp |
| 2005/0194681 A1 | 9/2005 | Hu et al. |
| 2005/0215177 A1 | 9/2005 | Prasad |
| 2005/0227590 A1 | 10/2005 | Sung |
| 2005/0250431 A1 | 11/2005 | Shih et al. |
| 2005/0260928 A1 | 11/2005 | Huh et al. |
| 2005/0260939 A1 | 11/2005 | Andrews et al. |
| 2005/0261150 A1 | 11/2005 | Yonker et al. |
| 2005/0274627 A1 | 12/2005 | Wylie et al. |
| 2005/0276967 A1 | 12/2005 | Prasad |
| 2005/0284536 A1 | 12/2005 | Kojima et al. |
| 2006/0014475 A1 | 1/2006 | Sekiya |
| 2006/0019587 A1 | 1/2006 | Deopura et al. |
| 2006/0024434 A1 | 2/2006 | Wang et al. |
| 2006/0052040 A1 | 3/2006 | Prasad |
| 2006/0079159 A1 | 4/2006 | Naujok et al. |
| 2006/0096179 A1 | 5/2006 | Lu et al. |
| 2006/0125133 A1 | 6/2006 | Huh et al. |
| 2006/0160478 A1 | 7/2006 | Donohue et al. |
| 2006/0185256 A1 | 8/2006 | Nevoret et al. |
| 2006/0189269 A1 | 8/2006 | Roy et al. |
| 2006/0192315 A1 | 8/2006 | Farr et al. |
| 2006/0226567 A1 | 10/2006 | James et al. |
| 2006/0249369 A1 | 11/2006 | Marangon et al. |
| 2006/0252900 A1 | 11/2006 | Bowman et al. |
| 2006/0276109 A1 | 12/2006 | Roy et al. |
| 2007/0007698 A1 | 1/2007 | Sano |
| 2007/0009606 A1 | 1/2007 | Serdy et al. |
| 2007/0032170 A1 | 2/2007 | Halley et al. |
| 2007/0037486 A1 | 2/2007 | Kang et al. |
| 2007/0054599 A1 | 3/2007 | Taylor et al. |
| 2007/0093185 A1 | 4/2007 | Naik |
| 2007/0117393 A1 | 5/2007 | Tregub et al. |
| 2007/0128874 A1 | 6/2007 | Shida et al. |
| 2007/0128991 A1 | 6/2007 | Yoon et al. |
| 2007/0149094 A1 | 6/2007 | Choi |
| 2007/0149096 A1 | 6/2007 | Nishimura et al. |
| 2007/0204420 A1 | 9/2007 | Hornby et al. |
| 2007/0212979 A1 | 9/2007 | Preston |
| 2007/0221287 A1 | 9/2007 | Izumoto |
| 2007/0235133 A1 | 10/2007 | Benassi |
| 2007/0235904 A1 | 10/2007 | Saikin |
| 2007/0243795 A1 | 10/2007 | Kobayashi et al. |
| 2007/0269987 A1 | 11/2007 | Nakano et al. |
| 2008/0004743 A1 | 1/2008 | Goers et al. |
| 2008/0009228 A1 | 1/2008 | Nagase et al. |
| 2008/0057845 A1 | 3/2008 | Prasad |
| 2008/0060734 A1 | 3/2008 | Stehle |
| 2008/0105818 A1 | 5/2008 | Cohen |
| 2008/0157436 A1 | 7/2008 | Patel et al. |
| 2008/0207100 A1 | 8/2008 | Roy et al. |
| 2008/0211141 A1 | 9/2008 | Deopura et al. |
| 2008/0220702 A1 | 9/2008 | Feng et al. |
| 2008/0255823 A1 | 10/2008 | Grant |
| 2008/0268760 A1 | 10/2008 | Bajaj et al. |
| 2008/0314878 A1 | 12/2008 | Cai et al. |
| 2009/0011679 A1 | 1/2009 | Bajaj et al. |
| 2009/0053976 A1 | 2/2009 | Roy et al. |
| 2009/0053983 A1 | 2/2009 | Hosaka et al. |
| 2009/0071938 A1 | 3/2009 | Dhindsa et al. |
| 2009/0081927 A1 | 3/2009 | Grumbine et al. |
| 2009/0093201 A1 | 4/2009 | Kazuno et al. |
| 2009/0094902 A1 | 4/2009 | Hou |
| 2009/0104856 A1* | 4/2009 | Hosaka ............... B29C 35/0866 51/293 |
| 2009/0105363 A1 | 4/2009 | Napadensky |
| 2009/0130956 A1 | 5/2009 | Ohta et al. |
| 2009/0133716 A1 | 5/2009 | Lee |
| 2009/0137121 A1 | 5/2009 | Hsu et al. |
| 2009/0169455 A1 | 7/2009 | Van Aert et al. |
| 2009/0206065 A1 | 8/2009 | Kruth et al. |
| 2009/0223810 A1 | 9/2009 | Dhindsa et al. |
| 2009/0253353 A1 | 10/2009 | Ogawa et al. |
| 2009/0270019 A1 | 10/2009 | Bajaj |
| 2009/0308553 A1 | 12/2009 | Souzy et al. |
| 2009/0308739 A1 | 12/2009 | Riker et al. |
| 2009/0311955 A1 | 12/2009 | Kerprich et al. |
| 2009/0318062 A1 | 12/2009 | Chiu et al. |
| 2009/0320379 A1 | 12/2009 | Jun et al. |
| 2009/0321979 A1 | 12/2009 | Hiraide |
| 2010/0007692 A1 | 1/2010 | Vanmaele et al. |
| 2010/0009612 A1 | 1/2010 | Park et al. |
| 2010/0011672 A1 | 1/2010 | Kincaid et al. |
| 2010/0018648 A1 | 1/2010 | Collins et al. |
| 2010/0087128 A1 | 4/2010 | Nakayama et al. |
| 2010/0112919 A1 | 5/2010 | Bonner et al. |
| 2010/0120249 A1 | 5/2010 | Hirose et al. |
| 2010/0120343 A1 | 5/2010 | Kato et al. |
| 2010/0130112 A1 | 5/2010 | Bajaj |
| 2010/0140850 A1 | 6/2010 | Napadensky et al. |
| 2010/0203815 A1* | 8/2010 | Bajaj ................... B24B 37/26 451/526 |
| 2010/0210197 A1 | 8/2010 | Matsumura et al. |
| 2010/0221489 A1 | 9/2010 | Lappalainen et al. |
| 2010/0255254 A1 | 10/2010 | Culler et al. |
| 2010/0323050 A1 | 12/2010 | Kumagai et al. |
| 2010/0326957 A1 | 12/2010 | Maeda et al. |
| 2011/0011217 A1 | 1/2011 | Kojima |
| 2011/0011535 A1 | 1/2011 | Dhindsa et al. |
| 2011/0014858 A1 | 1/2011 | Tsai et al. |
| 2011/0045199 A1 | 2/2011 | Cong |
| 2011/0045744 A1 | 2/2011 | Feng et al. |
| 2011/0048772 A1 | 3/2011 | Han |
| 2011/0059247 A1 | 3/2011 | Kuzusako et al. |
| 2011/0077321 A1 | 3/2011 | Napadensky |
| 2011/0130077 A1 | 6/2011 | Litke et al. |
| 2011/0171890 A1 | 7/2011 | Nakayama et al. |
| 2011/0180952 A1 | 7/2011 | Napadensky |
| 2011/0183583 A1 | 7/2011 | Joseph |
| 2011/0204538 A1 | 8/2011 | Drury |
| 2011/0277789 A1 | 11/2011 | Benson |
| 2011/0277877 A1 | 11/2011 | Stehle |
| 2012/0000887 A1 | 1/2012 | Eto et al. |
| 2012/0094487 A1 | 4/2012 | Kranz et al. |
| 2012/0178348 A1 | 7/2012 | Hsu et al. |
| 2012/0178845 A1 | 7/2012 | Napadensky et al. |
| 2012/0281334 A1 | 11/2012 | Sasaki et al. |
| 2012/0302148 A1 | 11/2012 | Bajaj et al. |
| 2012/0315830 A1 | 12/2012 | Joseph et al. |
| 2013/0012108 A1 | 1/2013 | Li et al. |
| 2013/0017769 A1 | 1/2013 | Kimura |
| 2013/0019570 A1 | 1/2013 | Weible |
| 2013/0048018 A1 | 2/2013 | Wargo et al. |
| 2013/0052917 A1 | 2/2013 | Park |
| 2013/0055568 A1 | 3/2013 | Dusel et al. |
| 2013/0059506 A1 | 3/2013 | Qian et al. |
| 2013/0059509 A1 | 3/2013 | Deopura et al. |
| 2013/0072025 A1 | 3/2013 | Singh et al. |
| 2013/0102231 A1 | 4/2013 | Joseph et al. |
| 2013/0107415 A1 | 5/2013 | Banna et al. |
| 2013/0122705 A1 | 5/2013 | Babu et al. |
| 2013/0137350 A1 | 5/2013 | Allison et al. |
| 2013/0139851 A1 | 6/2013 | Sin et al. |
| 2013/0154175 A1 | 6/2013 | Todorow et al. |
| 2013/0172509 A1 | 7/2013 | Pawloski et al. |
| 2013/0183824 A1 | 7/2013 | Kwon et al. |

(56) References Cited

U.S. PATENT DOCUMENTS

| | | |
|---|---|---|
| 2013/0200494 A1 | 8/2013 | Chen et al. |
| 2013/0203258 A1 | 8/2013 | Chen et al. |
| 2013/0212951 A1 | 8/2013 | Ahn |
| 2013/0231032 A1 | 9/2013 | Swedek et al. |
| 2013/0247477 A1 | 9/2013 | Cantrell et al. |
| 2013/0283700 A1 | 10/2013 | Bajaj et al. |
| 2013/0287980 A1 | 10/2013 | Burdzy et al. |
| 2013/0288483 A1 | 10/2013 | Sadjadi et al. |
| 2013/0307194 A1 | 11/2013 | Elsey |
| 2013/0309951 A1 | 11/2013 | Benvegnu et al. |
| 2013/0316081 A1 | 11/2013 | Kovalcik et al. |
| 2013/0327977 A1 | 12/2013 | Singh et al. |
| 2013/0328228 A1 | 12/2013 | Pettis et al. |
| 2014/0024216 A1 | 1/2014 | Stender et al. |
| 2014/0034229 A1 | 2/2014 | Xu |
| 2014/0034239 A1 | 2/2014 | Yang et al. |
| 2014/0048970 A1 | 2/2014 | Batchelder et al. |
| 2014/0065932 A1 | 3/2014 | Kazuno et al. |
| 2014/0069584 A1 | 3/2014 | Yang et al. |
| 2014/0109784 A1 | 4/2014 | Daems et al. |
| 2014/0117575 A1 | 5/2014 | Kemperle et al. |
| 2014/0127973 A1 | 5/2014 | Motoshima et al. |
| 2014/0163717 A1 | 6/2014 | Das et al. |
| 2014/0206268 A1 | 7/2014 | Lefevre et al. |
| 2014/0230170 A1 | 8/2014 | Patel |
| 2014/0239527 A1 | 8/2014 | Lee |
| 2014/0324206 A1 | 10/2014 | Napadensky |
| 2014/0364044 A1 | 12/2014 | Ahn et al. |
| 2014/0370214 A1 | 12/2014 | Araki et al. |
| 2014/0370788 A1 | 12/2014 | Nair |
| 2015/0024233 A1 | 1/2015 | Gunther |
| 2015/0031781 A1 | 1/2015 | Landers et al. |
| 2015/0037601 A1 | 2/2015 | Blackmore |
| 2015/0038066 A1 | 2/2015 | Huang et al. |
| 2015/0043122 A1 | 2/2015 | Eto et al. |
| 2015/0045928 A1 | 2/2015 | Perez et al. |
| 2015/0056421 A1 | 2/2015 | Yudovin-Farber et al. |
| 2015/0056892 A1 | 2/2015 | Vacassy et al. |
| 2015/0056895 A1 | 2/2015 | Fotou et al. |
| 2015/0061170 A1 | 3/2015 | Engel et al. |
| 2015/0065020 A1 | 3/2015 | Roy et al. |
| 2015/0072522 A1 | 3/2015 | Jung |
| 2015/0084238 A1 | 3/2015 | Bonassar et al. |
| 2015/0089881 A1 | 4/2015 | Stevenson et al. |
| 2015/0093977 A1 | 4/2015 | Deopura et al. |
| 2015/0114823 A1 | 4/2015 | Lee et al. |
| 2015/0115490 A1 | 4/2015 | Reinarz |
| 2015/0123298 A1 | 5/2015 | Napadensky |
| 2015/0126099 A1 | 5/2015 | Krishnan et al. |
| 2015/0129798 A1 | 5/2015 | Napadensky |
| 2015/0159046 A1 | 6/2015 | Dinega et al. |
| 2015/0174826 A1 | 6/2015 | Murugesh et al. |
| 2015/0216790 A1 | 8/2015 | Feng et al. |
| 2015/0221520 A1 | 8/2015 | Singh et al. |
| 2015/0252202 A1 | 9/2015 | Nerad |
| 2015/0375361 A1 | 12/2015 | Qian et al. |
| 2016/0052103 A1 | 2/2016 | Qian et al. |
| 2016/0068996 A1 | 3/2016 | Lau et al. |
| 2016/0073496 A1 | 3/2016 | Vincent |
| 2016/0101500 A1 | 4/2016 | Fung et al. |
| 2016/0107287 A1 | 4/2016 | Bajaj et al. |
| 2016/0107288 A1 | 4/2016 | Orilall et al. |
| 2016/0107290 A1 | 4/2016 | Bajaj et al. |
| 2016/0107295 A1 | 4/2016 | Bajaj et al. |
| 2016/0107381 A1 | 4/2016 | Krishnan et al. |
| 2016/0114458 A1 | 4/2016 | Bajaj et al. |
| 2016/0136787 A1 | 5/2016 | Bajaj et al. |
| 2016/0176021 A1 | 6/2016 | Orilall et al. |
| 2016/0198528 A1 | 7/2016 | Kitagawa |
| 2016/0221145 A1 | 8/2016 | Huang et al. |
| 2016/0229023 A1 | 8/2016 | Lugg et al. |
| 2016/0236279 A1 | 8/2016 | Ashton et al. |
| 2016/0252813 A1 | 9/2016 | Kitson |
| 2016/0257856 A1 | 9/2016 | Reiss et al. |
| 2016/0271869 A1 | 9/2016 | Van De Vrie et al. |
| 2016/0279757 A1 | 9/2016 | Qian et al. |
| 2016/0322242 A1 | 11/2016 | Nguyen et al. |
| 2016/0329244 A1 | 11/2016 | Chiao et al. |
| 2016/0346997 A1 | 12/2016 | Lewis et al. |
| 2016/0347002 A1 | 12/2016 | Bajaj et al. |
| 2016/0354901 A1 | 12/2016 | Krishnan et al. |
| 2016/0375546 A1 | 12/2016 | Pai et al. |
| 2017/0018411 A1 | 1/2017 | Sriraman et al. |
| 2017/0036320 A1 | 2/2017 | Prasad |
| 2017/0069462 A1 | 3/2017 | Kanarik et al. |
| 2017/0072466 A1 | 3/2017 | Zehavi et al. |
| 2017/0100817 A1 | 4/2017 | Ganapathiappan et al. |
| 2017/0110335 A1 | 4/2017 | Yang et al. |
| 2017/0113355 A1 | 4/2017 | Genetti et al. |
| 2017/0115657 A1 | 4/2017 | Trussell et al. |
| 2017/0117172 A1 | 4/2017 | Genetti et al. |
| 2017/0120416 A1 | 5/2017 | Chockalingam et al. |
| 2017/0133252 A1 | 5/2017 | Fung et al. |
| 2017/0136603 A1 | 5/2017 | Ganapathiappan et al. |
| 2017/0148539 A1 | 5/2017 | Prestayko et al. |
| 2017/0151648 A1 | 6/2017 | Huang et al. |
| 2017/0173865 A1 | 6/2017 | Dikovsky et al. |
| 2017/0178917 A1 | 6/2017 | Kamp et al. |
| 2017/0182629 A1 | 6/2017 | Lehuu et al. |
| 2017/0203406 A1 | 7/2017 | Ganapathiappan et al. |
| 2017/0203408 A1 | 7/2017 | Ganapathiappan et al. |
| 2017/0203409 A1 | 7/2017 | Lefevre et al. |
| 2017/0213753 A1 | 7/2017 | Rogers |
| 2017/0236688 A1 | 8/2017 | Caron et al. |
| 2017/0236741 A1 | 8/2017 | Angelov et al. |
| 2017/0236743 A1 | 8/2017 | Severson et al. |
| 2017/0239886 A1 | 8/2017 | Norikane |
| 2017/0250056 A1 | 8/2017 | Boswell et al. |
| 2017/0259396 A1 | 9/2017 | Yamamura et al. |
| 2017/0259499 A1 | 9/2017 | Ng et al. |
| 2017/0263478 A1 | 9/2017 | McChesney et al. |
| 2017/0274498 A1 | 9/2017 | Oh et al. |
| 2017/0316935 A1 | 11/2017 | Tan et al. |
| 2017/0330734 A1 | 11/2017 | Lee et al. |
| 2017/0330786 A1 | 11/2017 | Genetti et al. |
| 2017/0334074 A1 | 11/2017 | Genetti et al. |
| 2017/0338140 A1 | 11/2017 | Pape |
| 2017/0372912 A1 | 12/2017 | Long et al. |
| 2018/0025891 A1 | 1/2018 | Marakhtanov et al. |
| 2018/0043613 A1 | 2/2018 | Krishnan et al. |
| 2018/0100073 A1 | 4/2018 | Chopra et al. |
| 2018/0100074 A1 | 4/2018 | Chopra et al. |
| 2018/0100075 A1 | 4/2018 | Chopra et al. |
| 2018/0158707 A1 | 6/2018 | Hunter et al. |
| 2018/0161954 A1 | 6/2018 | Bajaj et al. |
| 2018/0229343 A1 | 8/2018 | Kim et al. |
| 2018/0236632 A1 | 8/2018 | Murugesh et al. |
| 2018/0323042 A1 | 11/2018 | Wang et al. |
| 2018/0339397 A1 | 11/2018 | Redfield |
| 2018/0339402 A1 | 11/2018 | Redfield et al. |
| 2018/0339447 A1 | 11/2018 | Redfield |
| 2018/0340104 A1 | 11/2018 | Hampson et al. |
| 2018/0366305 A1 | 12/2018 | Nagami et al. |
| 2018/0371276 A1 | 12/2018 | Miyano |
| 2019/0030678 A1 | 1/2019 | Kumar et al. |
| 2019/0039204 A1 | 2/2019 | Chockalingam et al. |
| 2019/0047112 A1 | 2/2019 | Fu et al. |
| 2019/0198298 A1 | 6/2019 | Hirose et al. |
| 2019/0202024 A1 | 7/2019 | Ganapathiappan et al. |
| 2019/0218697 A1 | 7/2019 | Nakayama et al. |
| 2019/0224809 A1 | 7/2019 | Ganapathiappan et al. |
| 2019/0228952 A1 | 7/2019 | Dorf et al. |
| 2019/0299357 A1 | 10/2019 | Orilall et al. |
| 2019/0299537 A1 | 10/2019 | McClintock et al. |
| 2019/0322031 A1 | 10/2019 | Kritchman |
| 2019/0337117 A1 | 11/2019 | Ganapathiappan et al. |
| 2020/0001433 A1 | 1/2020 | Bajaj et al. |
| 2020/0055161 A1 | 2/2020 | Chockalingham et al. |
| 2020/0070302 A1 | 3/2020 | Ganapathiappan et al. |
| 2020/0101657 A1 | 4/2020 | Krishnan et al. |
| 2020/0135517 A1 | 4/2020 | Fung et al. |
| 2020/0147750 A1 | 5/2020 | Bajaj et al. |
| 2020/0156311 A1 | 5/2020 | Rolland et al. |
| 2020/0161098 A1 | 5/2020 | Cui et al. |

(56) References Cited

U.S. PATENT DOCUMENTS

| | | |
|---|---|---|
| 2020/0230781 A1 | 7/2020 | Chockalingam et al. |
| 2020/0299834 A1 | 9/2020 | Bajaj et al. |
| 2020/0325353 A1 | 10/2020 | Sridhar et al. |
| 2021/0013014 A1 | 1/2021 | Sarode Vishwanath |
| 2021/0039167 A1 | 2/2021 | Ashton et al. |
| 2021/0107116 A1 | 4/2021 | Bajaj et al. |
| 2021/0187822 A1 | 6/2021 | Yudovin-Farber et al. |
| 2021/0220857 A1 | 7/2021 | Baker et al. |

FOREIGN PATENT DOCUMENTS

| | | |
|---|---|---|
| CN | 1531473 A | 9/2004 |
| CN | 1543669 A | 11/2004 |
| CN | 1569399 A | 1/2005 |
| CN | 1802237 A | 7/2006 |
| CN | 1829587 A | 9/2006 |
| CN | 1851896 A | 10/2006 |
| CN | 1897226 A | 1/2007 |
| CN | 101124067 A | 2/2008 |
| CN | 101166604 A | 4/2008 |
| CN | 101199994 A | 6/2008 |
| CN | 101428404 A | 5/2009 |
| CN | 101612722 A | 12/2009 |
| CN | 201483382 U | 5/2010 |
| CN | 101642898 B | 9/2011 |
| CN | 102892553 A | 1/2013 |
| CN | 202825512 U | 3/2013 |
| CN | 103153540 A | 6/2013 |
| CN | 103252729 A | 8/2013 |
| CN | 103465155 A | 12/2013 |
| CN | 103561907 A | 2/2014 |
| CN | 203542340 U | 4/2014 |
| CN | 104210108 A | 12/2014 |
| CN | 104385595 A | 3/2015 |
| CN | 104400998 A | 3/2015 |
| CN | 104607639 A | 5/2015 |
| CN | 103465155 B | 5/2016 |
| DE | 19834559 A1 | 2/2000 |
| DE | 10314075 A1 | 10/2004 |
| DE | 102004042911 A1 | 3/2006 |
| EP | 1078717 A3 | 7/2003 |
| EP | 1419876 A2 | 5/2004 |
| EP | 1512519 A2 | 3/2005 |
| EP | 1661690 A1 | 5/2006 |
| EP | 1747878 A1 | 1/2007 |
| EP | 1419876 B1 | 4/2008 |
| EP | 2025458 A2 | 2/2009 |
| EP | 2025459 A2 | 2/2009 |
| EP | 2277686 A2 | 1/2011 |
| EP | 2431157 A1 | 3/2012 |
| EP | 2463082 A1 | 6/2012 |
| GB | 2362592 A | 11/2001 |
| JP | H07102724 B2 | 11/1995 |
| JP | H08132342 A | 5/1996 |
| JP | 09076353 A | 3/1997 |
| JP | H11235656 A | 8/1999 |
| JP | 11-254542 A | 9/1999 |
| JP | H11254542 A | 9/1999 |
| JP | 11-347761 A | 12/1999 |
| JP | H11347761 A | 12/1999 |
| JP | 2000061817 A | 2/2000 |
| JP | 2001018163 A | 1/2001 |
| JP | 2001507634 A | 6/2001 |
| JP | 2001507997 A | 6/2001 |
| JP | 200228849 A | 1/2002 |
| JP | 200267171 A | 3/2002 |
| JP | 2002151447 A | 5/2002 |
| JP | 3324643 B2 | 9/2002 |
| JP | 2003303793 A | 10/2003 |
| JP | 2004235446 A | 8/2004 |
| JP | 3566430 B2 | 9/2004 |
| JP | 2004243518 A | 9/2004 |
| JP | 2004281685 A | 10/2004 |
| JP | 2005074614 A | 3/2005 |
| JP | 3641956 B2 | 4/2005 |
| JP | 2005-294661 A | 10/2005 |
| JP | 3801100 B2 | 7/2006 |
| JP | 20060192315 A | 7/2006 |
| JP | 2006231464 A | 9/2006 |
| JP | 2006305650 A | 11/2006 |
| JP | 2007-005612 A | 1/2007 |
| JP | 2007184638 A | 7/2007 |
| JP | 2007-235001 A | 9/2007 |
| JP | 2007281435 A | 10/2007 |
| JP | 4077192 B2 | 4/2008 |
| JP | 2008531306 A | 8/2008 |
| JP | 2008539093 A | 11/2008 |
| JP | 2008546167 A | 12/2008 |
| JP | 2009-101487 A | 5/2009 |
| JP | 20100120249 A | 6/2010 |
| JP | 4512529 B2 | 7/2010 |
| JP | 2011067946 A | 4/2011 |
| JP | 4693024 B2 | 6/2011 |
| JP | 4798713 B2 | 10/2011 |
| JP | 2012507409 A | 3/2012 |
| JP | 2012516247 A | 7/2012 |
| JP | 2013-018056 A | 1/2013 |
| JP | 5143528 B2 | 2/2013 |
| JP | 2013515379 A | 5/2013 |
| JP | 2013107254 A | 6/2013 |
| JP | 5226359 B2 | 7/2013 |
| JP | 5248152 B2 | 7/2013 |
| JP | 2013169645 A | 9/2013 |
| JP | 5697889 B2 | 4/2015 |
| JP | 2016023209 A | 2/2016 |
| JP | 5994183 B2 | 9/2016 |
| JP | 6422325 B2 | 11/2018 |
| JP | 6584895 B2 | 10/2019 |
| KR | 10-2000-0075987 A | 12/2000 |
| KR | 100288410 B1 | 6/2001 |
| KR | 2003-0020658 A | 3/2003 |
| KR | 2005-0052876 A | 6/2005 |
| KR | 100495404 B1 | 6/2005 |
| KR | 10-0606476 B1 | 8/2006 |
| KR | 20080038607 A | 5/2008 |
| KR | 20100028294 A | 3/2010 |
| KR | 20130092625 A | 8/2013 |
| KR | 20130138841 A | 12/2013 |
| KR | 1020130138841 | 12/2013 |
| KR | 10-2015-0047628 A | 5/2015 |
| TW | 519506 B | 2/2003 |
| TW | 200528529 A | 9/2005 |
| TW | 290576 B | 12/2007 |
| TW | 200909134 A | 3/2009 |
| TW | 200924907 A | 6/2009 |
| TW | 200927382 A | 7/2009 |
| TW | 201016387 A | 5/2010 |
| TW | 374792 B | 10/2012 |
| TW | 388398 B | 3/2013 |
| TW | 201350265 A | 12/2013 |
| WO | 9830356 A1 | 7/1998 |
| WO | 1998047662 A1 | 10/1998 |
| WO | 2000002707 A1 | 1/2000 |
| WO | 2000002708 A1 | 1/2000 |
| WO | 2001043920 A1 | 6/2001 |
| WO | 2001053040 A1 | 7/2001 |
| WO | 01/64396 A1 | 9/2001 |
| WO | 2001083167 A1 | 11/2001 |
| WO | 02/24415 A1 | 3/2002 |
| WO | 2002070200 A1 | 9/2002 |
| WO | 0238688 A3 | 10/2002 |
| WO | 03089702 A1 | 10/2003 |
| WO | 03/103959 A1 | 12/2003 |
| WO | 2003099518 A1 | 12/2003 |
| WO | 2004037490 A1 | 5/2004 |
| WO | 2005000526 A1 | 1/2005 |
| WO | 2005100497 A1 | 10/2005 |
| WO | 2006003697 A1 | 1/2006 |
| WO | 2007001699 A1 | 1/2007 |
| WO | 2007024464 A1 | 3/2007 |
| WO | 2007055678 A2 | 5/2007 |
| WO | 2007055901 A1 | 5/2007 |
| WO | 2009026776 A1 | 3/2009 |
| WO | 2009158665 A1 | 12/2009 |

(56) References Cited

FOREIGN PATENT DOCUMENTS

| | | |
|---|---|---|
| WO | 2010066448 A1 | 6/2010 |
| WO | 2010123744 A2 | 10/2010 |
| WO | 2011/088057 A1 | 7/2011 |
| WO | 2011082155 A2 | 7/2011 |
| WO | 2012173885 A2 | 12/2012 |
| WO | 2012173885 A3 | 5/2013 |
| WO | 2013128452 | 9/2013 |
| WO | 2013162856 A1 | 10/2013 |
| WO | 2014039378 A1 | 3/2014 |
| WO | 2014/095200 A1 | 6/2014 |
| WO | 2014141276 A2 | 9/2014 |
| WO | 2015040433 A2 | 3/2015 |
| WO | 2015055550 A1 | 4/2015 |
| WO | 2015/111366 A1 | 7/2015 |
| WO | 2015/120430 A1 | 8/2015 |
| WO | 2015118552 A1 | 8/2015 |
| WO | 20150161210 A1 | 10/2015 |

OTHER PUBLICATIONS

Office Action from Korean Patent Application No. 10-2022-7000942 dated Mar. 28, 2022.
Taiwan Office Action dated Apr. 15, 2021 for Taiwan Patent Application No. 108128180.
Chinese Office Action dated Mar. 8, 2021 for Chinese Patent Application No. 201910517080.0.
Notice of Allowance for Korean Application No. 10-2017-7013107 dated Dec. 4, 2021.
Korean Office Action issued to Patent Application No. 10-2022-7035681 dated Feb. 2, 2023.
EPO Office Action dated Jun. 19, 2020, for European Application No. 15850855.6.
Chinese Office Action dated Sep. 8, 2020 for Chinese Patent Application No. 201910517080.0.
C. Wong. "Damping Associated with Incipient Melting in Aluminum-Indium Alloys", David Taylor Research Center—SME 89-99. Jan. 1990.
Tammy Hickey et al. "Internal Friction and Modules Studies on Austempered Ductile Iron", Technical Report ARCCB-TR-98001. Jan. 1996. 24 pages.
Byoung-Ho Kwon et al. "Dishing and Erosion in STI CMP". System IC R&D Center, Hyundai Electronics Industries Co. Ltd. 1999 IEEE. 3 pages.
S. Raghavan et al. "Chemical Mechanical Planarization in Integrated Circuit Device Manufacturing". vol. 98-7. 1998. 19 pages.
John J. Aklonis et al. "Introduction to Polymer Viscoelasticity". Second Edition. 1983. 6 pages.
The Dow Chemical Company—"Specialty Elastomers for Automotive TPO Compounds" brochure, Nov. 2006, 8 pages.
The Dow Chemical Company —"Dow VLDPE DFDB-1085 NT, Very Low Density Polyethylene Resin" Technical Data, UL Prospector, Oct. 2003, 2 pages.
Lubrizol Advanced Materials, Inc.—"Lubrizol Engineered Polymers, Estane 58144 TPU" Technical Data, Feb. 2014, 2 pages.
Sekisui Voltek, LLC—"Volara Type EO" Technical Data, Jan. 2010, 2 pages.
Rogers Corporation, High Performance Foams Division, PORON Microcellular Urethanes—Product Availability Booklet, May 1, 2015, 11 pages.
Andrews, Rodney J., et al.—"Glass Transition Temperatures of Polymers," Polymer Handbook, Fourth Edition, J. Brandrup et al., Editors, A Wiley Interscience Publication, John Wiley & Sons, Inc., 1999, VI / 193-198.
Crow—"Glass Transition Temperature," webpage, Polymer Properties Database, http://polymerdatabase.com/polymer%20physics/GlassTransition.html, 2015, printed Apr. 10, 2019, 2 pages.
Crow—"Glass Transition Temperatures," webpage, Polymer Properties Database, http://polymerdatabase.com/polymer%20physics/Polymer%20Tg%20C.html, 2015, printed Apr. 10, 2019, 6 pages.
HUPC—"Dipropylene Glycol Diacrylate (DPGDA)" webpage, CAS No. 57472-68-1_Radiation, http://www.union-pigment.com/china/radiation-curable-57472.html, printed Apr. 8, 2019, 2 pages.
Polysciences, Inc.—"Monomers Product Guide," 2012, 16 pages.
Whisnaut, David—"Polymer Chemistry: The Glass Transition" webpage, Engineering Libre Texts, https://eng.libretexts.org/Bookshelves/Materials_Schience?Supplemental_Modules_Materia . . . , printed Apr. 10, 2019, 2 pages.
Sigma-Aldrich—"Thermal Transitions of Homopolymers: Glass Transition & Melting Point" webpage, https://www.sigmaaldrich.com/technical-documents/articles/materials-science/polymer-scie . . . , printed Apr. 8, 2019, 3 pages.
Moylan, John—"Considerations for Measuring Glass Transition Temperature," webpage on Element Materials Technology's website, https://www.element.com/nucleus/2017/08/15/18/45/considerations-for-measuring-glass-transition-temperature, Feb. 19, 2019, 8 pages.
ASTM International—"Standard Test Method for Assignment of the Glass Transition Temperature by Dynamic Mechanical Analysis," standard issued under Designation E1640, current edition approved Aug. 1, 2013, 6 pages.
Wikipedia—"Contact angle" webpage, https://en.wikipedia.org/wiki/Contact_angle, last edited Dec. 14, 2019, 9 pages.
ASTM International—"Standard Terminology for Additive Manufacturing Technologies," ASTM Designation: F2792-12a, copyright dated Sep. 9, 2013, pp. 1-3.
Merriam-Webster Dictionary—"Droplet," https://www.merriam-webster.com/dictionary/droplet, accessed Feb. 24, 2020, 8 pages.
Shahrubudin, N., et al.—"An Overview on 3D Printing Technology: Technological, Materials, and Applications," 2nd International Conference on Sustainable Materials Processing and Manufacturing (SMPM 2019), Procedia Manufacturing, 35 (2019), published by Elsevier B.V., pp. 1286-1296.
Wikipedia—"Drop (liquid)," https://en.wikipedia.org/wiki/Drop_(liquid), last edited Feb. 12, 2020, accessed Feb. 24, 2020, 5 pages.
J.-G. Park, et al., Post-CMP Cleaning: Interaction between Particles and Surfaces, International Conference on Planarization/CMP Technology, Oct. 25-27, 2007, VDE Verlag CMBH, Berlin-Offenbach, 6 pp.
Pan, GuoShun et al.—"Preparation of silane modified SiO2 abrasive particles and their Chemical Mechanical Polishing (CMP) performances," Wear 273 (2011), pp. 100-104.
Epoxy Technology Inc.—"Tech Tip 23: Tg—Glass Transition Temperature for Epoxies" brochure, date unknown, 2 pages.
Rao, Sunil M., The Effectiveness of Silane and Siloxane Treatments on the Superhydrophobicity and Icephobicity of Concrete Surfaces, Rao, Phd Thesis, 1-118.
A Breakthrough Method for the Effective Conditioning of PVA Brush Used for Post-CMP Process, Lee et al., ECS Journal of Solid State Science and Technology 8, p. 307-p. 312 (2019), Published Jun. 5, 2019, 6 pages.
Influence of post-CMP cleaning on Cu interconnects and TDDB reliability, Noguchi et al., IEEE Transactions on Electron Devices 52, 934-941 (2005), Published Apr. 25, 2005, 8 pages.
Arkema, "Liquid Resins for UV Curling", N3XTDIMENSION. Sartomer's Custom Liquid Resin Systems. 3D-arkema.com.
GPS Safety Summary, "Tripropyleneglycol diacrylate", (TPGDA—SR 306)—Mar. 11, 2013.
Shyam Dev Maurya et al. "A Review on Acrylate-Terminated Urethane Oligomers and Polymers: Synthesis and Applications", Polymer-Plastics Technology and Engineering. ISSN:0360-2559 (Print) 1525-6111 (Online) Journal homepage: https://www.tandfonline.com/loi/lpte20.
UV/EB Curable Resins. Product Guide—Americas. www.allnex.com.
Office Action for Korean Application No. 10-2017-7013107 dated Jun. 28, 2021.
Communication pursuant to Article 94(3) EPC for European Application No. 15850855.6 dated Sep. 22, 2021.
Wikipedia—"Cross-link" webpage at <https://en.wikipedia.org/wiki/Cross-link>, printed Mar. 8, 2019, 8 pages.
Plastics in Action; 3-D Printing Speeds Prototype Development dated May/Jun. 1998; 2 total pages.
Wikipedia [online]; 3D Printing; 2013; 17 total pages.

(56) References Cited

OTHER PUBLICATIONS

3D Printing: The Next Industrial Revolution: Christopher Barnatt Publisher: CreateSpace Independent Publishing Platform (May 4, 2013) Language: English, ISBN-10: 148418176X ISBN-13: 978-1484181768.
Rodel. Rodel IC1000 CMP Pad. 1999. 2 pages.
Byoung-Ho Kwon et al. "Dishing and Ersosion in STI CMP". System IC R&D Center, Hyundai Electronics Industries Co. Ltd. 1999 IEEE. 3 pages.
S. Raghavan et al. "Chemical Mechanical Planariarization in Integrated Circuit Device Manufacturing". vol. 98-7. 1998. 19 pages.
Rajeev Bajaj et al. "Effect of Polishing Pad Material Properties on Chemical Mechanical Polishing (CMP) Processes". 1994. 8 pages.
Rodel. Rodel IC1010. 1998. 2 pages.
Peter Freeman et al. "A Study of the Variation of Physical Properties in Random Lots of Urethane Polishing Pads for CMP". A RODEL Publication. vol. 2, Issue 6. Jun. 1996. 8 Pages.
Weidan Li et al. "The Effect of the Polishing Pad Treatments on the Chemical-Mechanical Polishing of SiO2 Films", Thin Solid Films 270 (1995). 6 pages.
Antje M.J. Van Den Berg, "Inkjet Printing of Polyurethane Colloidal Suspensions", www.rsc.org/softmatter. Jul. 13, 2006.
Peter Krober et al. "Reactive Inkjet Printing of Polyurethanes", www.rsc.org/materials. Journal of Materials Chemistry. Jan. 6, 2009.
Yu-Lim Jun et al. "Slicing Bitmap Generation and Patterning Technique a SFF System Using UV-Resin", International Conference on Control, Automation and Systems 2007. 5 Pages.
H. Yang. "High Viscosity Jetting System for 3D Reactive Inkjet Printing", Additive Manufacturing and 3D Printing Group, University of Nottingham. 9 pages.
I Hermant et al. "A Comparative Study of Polyurethane-Poly(Methyl Methacrylate) Interpenetrating and Semi-1 Interprenetrating Polymer Networks", vol. 20, No. 1. pp. 85-89, 1984.
Lee M. Cook. "CMP Consumables II: Pad" Chapter 6. Semiconductors and Semimetals, vol. 63. Published 1999. Chemical Mechanical Polishing in Silicon Processing. ISBN: 978-0-12-752172-5.
European Search Report for Application No. 15850855.6.
Taiwan Office Action for Application No. 104133737 dated Nov. 22, 2018.
Chinese Office Action for Application No. 201580056366.3 dated Sep. 28, 2018.
Notice of Allowance for Chinese Application No. 201580056366.3 dated May 9, 2019.
Japanese Office Action for Application No. JP 2017-520353 dated Jul. 23, 2019.
Taiwan Office Action dated Jan. 6, 2020 for Taiwan Patent Application No. 108128180.
Japanese Office Action dated Mar. 3, 2020, for Japanese Patent Application No. 2017520353.
Taiwan Office Action dated May 26, 2020 for Taiwan Patent Application No. 108128180.
EPO Office Action dated Mar. 16, 2021, for European Application No. 15850855.6.
European Search Report dated Oct. 18, 2023 for Application No. 23182827.8.

* cited by examiner

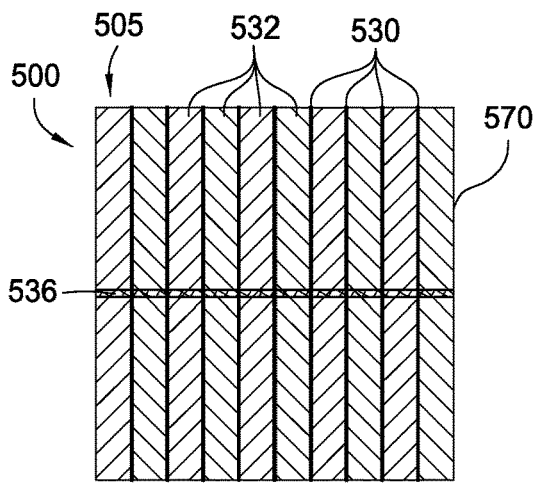 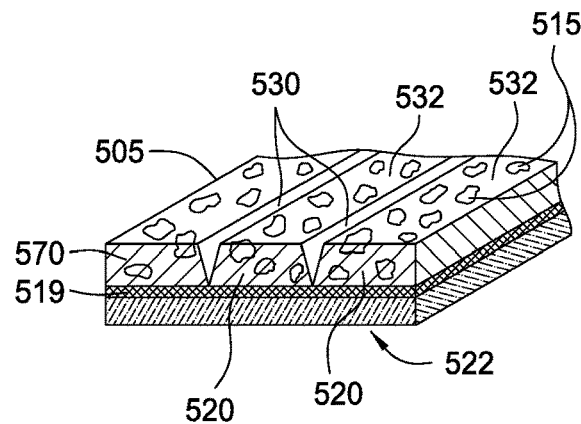
FIG. 5A  FIG. 5B
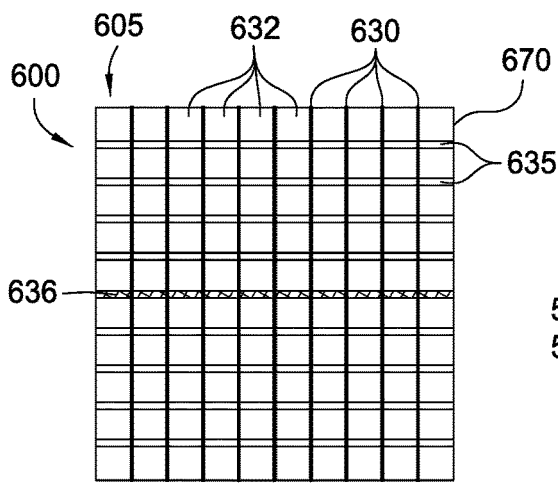 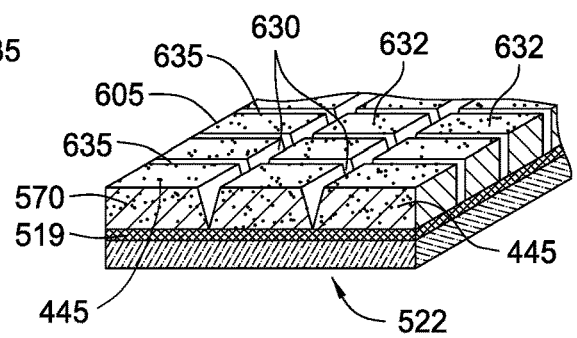
FIG. 6A  FIG. 6B
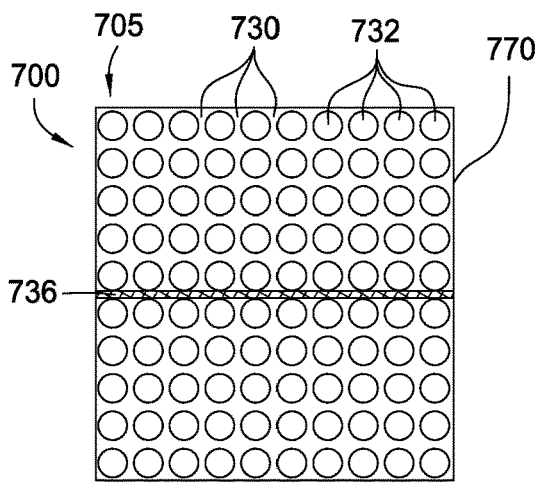 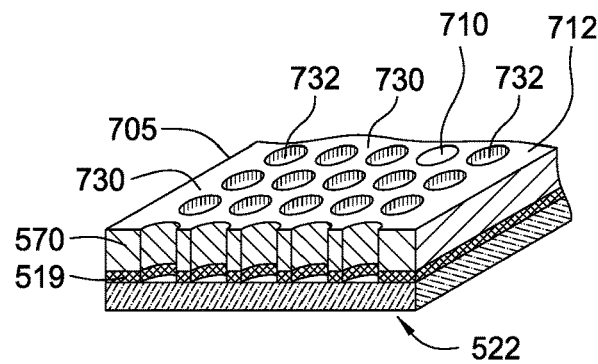
FIG. 7A  FIG. 7B

POLISHING ARTICLES AND INTEGRATED SYSTEM AND METHODS FOR MANUFACTURING CHEMICAL MECHANICAL POLISHING ARTICLES

CROSS-REFERENCE TO RELATED APPLICATION

This application is a continuation of U.S. patent application Ser. No. 15/722,810, filed Oct. 2, 2017, now U.S. Pat. No. 10,493,691, which is a continuation of U.S. patent application Ser. No. 14/863,409, filed Sep. 23, 2015, now U.S. Pat. No. 9,776,361, which claims benefit of U.S. Provisional Patent Application No. 62/065,533 filed Oct. 17, 2014. Each of the aforementioned related patent applications is herein incorporated by reference in their entirety.

BACKGROUND

Field

Embodiments of the disclosure generally relate to an apparatus and method for chemical mechanical polishing of substrates or wafers, more particularly, to a polishing article manufacturing system and a method of manufacture of a polishing pad or polishing article for chemical mechanical polishing.

Description of the Related Art

In the fabrication of integrated circuits and other electronic devices on substrates, multiple layers of conductive, semiconductive, and dielectric materials are deposited on or removed from a feature side of a substrate. The sequential deposition and removal of these materials on the substrate may cause the feature side to become non-planar and require a planarization process, generally referred to as polishing, where previously deposited material is removed from the feature side of a substrate to form a generally even, planar or level surface. The process is useful in removing undesired surface topography and surface defects, such as rough surfaces, agglomerated materials, crystal lattice damage and scratches. The polishing process is also useful in forming features on a substrate by removing excess deposited material used to fill the features and to provide an even or level surface for subsequent deposition and processing.

One polishing process is known as Chemical Mechanical Polishing (CMP) where a substrate is placed in a substrate carrier assembly and controllably urged against a polishing media mounted to a moving platen assembly. The polishing media is typically a polishing article or polishing pad. The carrier assembly provides rotational movement relative to the moving platen and material removal is accomplished by chemical activity, mechanical abrasion, or a combination of chemical activity and mechanical abrasion between the feature side of the substrate and the polishing media.

However, the polishing process results in "glazing" or smoothening of a polishing surface of the polishing media, which reduces film removal rate. The surface of the polishing media is then "roughened" or conditioned to restore the polishing surface, which enhances local fluid transport and improves removal rate. Typically, conditioning is performed, in between polishing two wafers or in parallel with polishing the wafer, with a conditioning disk coated with abrasives such as micron sized industrial diamonds. The conditioning disk is rotated and pressed against the surface of the media and mechanically cuts the surface of the polishing media. However, while the rotation and/or down force applied to the conditioning disk is controlled, the cutting action is relatively indiscriminate, and the abrasives may not cut into the polishing surface evenly, which creates a differential in surface roughness across the polishing surface of the polishing media. As the cutting action of the conditioning disk is not readily controlled, the media life may be shortened. Further, the cutting action of the conditioning disk sometimes produces large asperities in the polishing surface, along with pad debris. While the asperities are beneficial in the polishing process, the asperities may break loose during polishing, which creates debris that, along with pad debris from cutting action, contributes to defects in the substrate.

Numerous other methods and systems that act on the polishing surface of the polishing article have been performed in an attempt to provide uniform conditioning of the polishing surface. However, control of the devices and systems (e.g., cutting action, down force, among other metrics) remain unsatisfactory and may be frustrated by the properties of the polishing media itself. For example, properties such hardness and/or density of the pad media may be non-uniform, which leads to more aggressive conditioning on some portions of the polishing surface relative to other portions.

Therefore, there is a need for a polishing article having properties that facilitate uniform polishing and conditioning.

SUMMARY

Embodiments of the disclosure generally relate to an apparatus and method for chemical mechanical polishing of substrates or wafers, more particularly, to a polishing article, a polishing article manufacturing system and a method of manufacture of a polishing article for chemical mechanical polishing.

In one embodiment, a polishing article manufacturing system includes a feed section and a take-up section, the take-up section comprising a supply roll having a polishing article disposed thereon for a chemical mechanical polishing process, a print section comprising a plurality of printheads disposed between the feed section and the take-up section, and a curing section disposed between the feed section and the take-up section, the curing section comprising one or both of a thermal curing device and an electromagnetic curing device.

In another embodiment, a polishing article is provided and includes a composite pad body. The composite pad body includes a plurality of polishing features forming a polishing surface, wherein the plurality of polishing features are formed from a first material, and one or more base features formed from a second material, wherein the one or more base features surround the plurality of polishing features to form a unitary body and the first material has a hardness greater than a hardness of the second material In another embodiment, a replacement supply roll for a chemical mechanical polishing process is provided and includes a rod having a polishing article wound thereon. The polishing article includes a composite pad body, comprising a plurality of polishing features forming a polishing surface, wherein the plurality of polishing features are formed from a first material, and one or more base features formed from a second material, wherein the one or more base features surround the plurality of polishing features to form a unitary body and the first material has a hardness greater than a hardness of the second material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5A is a top view of one embodiment of a polishing article assembly.

FIG. 5B is an enlarged isometric view of a portion of the polishing article assembly shown in FIG. 5A.

FIG. 6A is a top view of another embodiment of a polishing article assembly.

FIG. 6B is an enlarged isometric view of a portion of the polishing article assembly in FIG. 6A.

FIG. 7A is a top view of another embodiment of a polishing article assembly.

FIG. 7B is an enlarged isometric view of a portion of the polishing article assembly shown in FIG. 6A.

To facilitate understanding, common words have been used, where possible, to designate identical elements that are common to the figures. It is contemplated that elements disclosed in one embodiment may be beneficially utilized on other embodiments without specific recitation.

DETAILED DESCRIPTION

Figure 1:
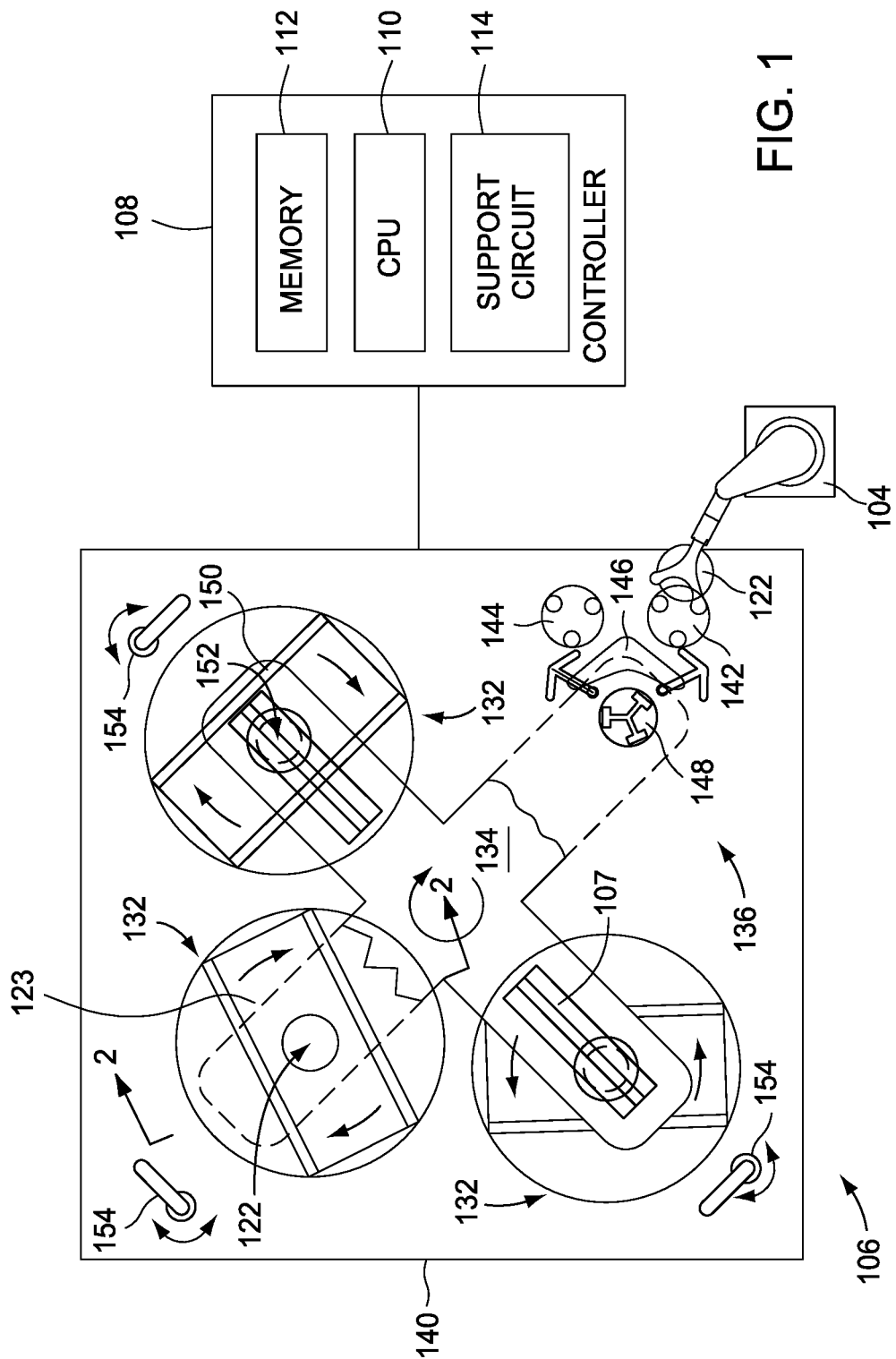
FIG. 1 is a plan view of an exemplary chemical mechanical polishing module.

FIG. 1 depicts a plan view of a polishing module 106 which is a portion of a REFLEXION® Chemical Mechanical Polisher, manufactured by Applied Materials, Inc., located in Santa Clara, California Embodiments described herein may be used on this polishing system. However, one skilled in the art may advantageously adapt embodiments as taught and described herein to be employed on other chemical mechanical polishers produced by other manufacturers that utilize polishing material, and particularly polishing material in a roll format.

The polishing module 106 generally comprises a loading robot 104, a controller 108, a transfer station 136, a plurality of processing or polishing stations, such as platen assemblies 132, a base 140 and a carousel 134 that supports a plurality of polishing or carrier heads 152 (only one is shown in FIG. 1). Generally, the loading robot 104 is disposed proximate the polishing module 106 and a factory interface 102 (not shown) to facilitate the transfer of substrates 122 therebetween.

The transfer station 136 generally includes a transfer robot 146, an input buffer 142, an output buffer 144 and a load cup assembly 148. The input buffer station 142 receives a substrate 122 from the loading robot 104. The transfer robot 146 moves the substrate 122 from the input buffer station 142 and to the load cup assembly 148 where it may be transferred to the carrier head 152.

To facilitate control of the polishing module 106 as described above, the controller 108 comprises a central processing unit (CPU) 110, support circuits 146 and memory 112. The CPU 110 may be one of any form of computer processor that can be used in an industrial setting for controlling various polishers, drives, robots and sub-processors. The memory 112 is coupled to the CPU 110. The memory 112, or computer-readable medium, may be one or more of readily available memory such as random access memory (RAM), read only memory (ROM), floppy disk, hard disk, or any other form of digital storage, local or remote. The support circuits 114 are coupled to the CPU 110 for supporting the processor in a conventional manner. These circuits include cache, power supplies, clock circuits, input/output circuitry, subsystems, and the like.

Generally, the carousel 134 has a plurality of arms 150 that each support one of the carrier heads 152. Two of the arms 150 depicted in FIG. 1 are shown in phantom such that the transfer station and a planarizing or polishing article 123 disposed on one of the platen assemblies 132 may be seen. The carousel 134 is indexable such that the carrier heads 152 may be moved between the platen assemblies 132 and the transfer station 136.

Typically, a chemical mechanical polishing process is performed at each platen assembly 132 by moving the substrate 122 retained in the carrier head 152 relative to the polishing article 123 supported on the platen assembly 132. The polishing article 123 may have a smooth surface, a textured surface, a surface containing abrasives, or a combination thereof. Additionally, the polishing article 123 may be advanced across or releasably fixed to the polishing surface. Typically, the polishing article 123 is releasably fixed by vacuum, mechanical clamps or by other holding methods to the platen assembly 132.

Embodiments of the polishing article 123 may comprise a polymer material that is produced by a three-dimensional (3D) printing process according to embodiments described herein. The polishing article 123 may include nano-sized features (e.g., particles and/or discrete regions or domains within a polymer matrix having sizes of about 10 nanometers to about 200 nanometers). The polishing process may utilize a slurry containing abrasive particles delivered to the pad surface by fluid nozzles 154 to aid in polishing the substrate 122. The fluid nozzles 154 may rotate in the direction shown to a position clear of the platen assemblies 132 as shown, to a position over each of the platen assemblies 132.

3D printing as described herein includes, but is not limited to, polyjet deposition, inkjet printing, fused deposition modeling, binder jetting, powder bed fusion, selective laser sintering, stereolithography, vat photopolymerization digital light processing, sheet lamination, directed energy deposition, among other 3D deposition or printing processes.

Figure 2:
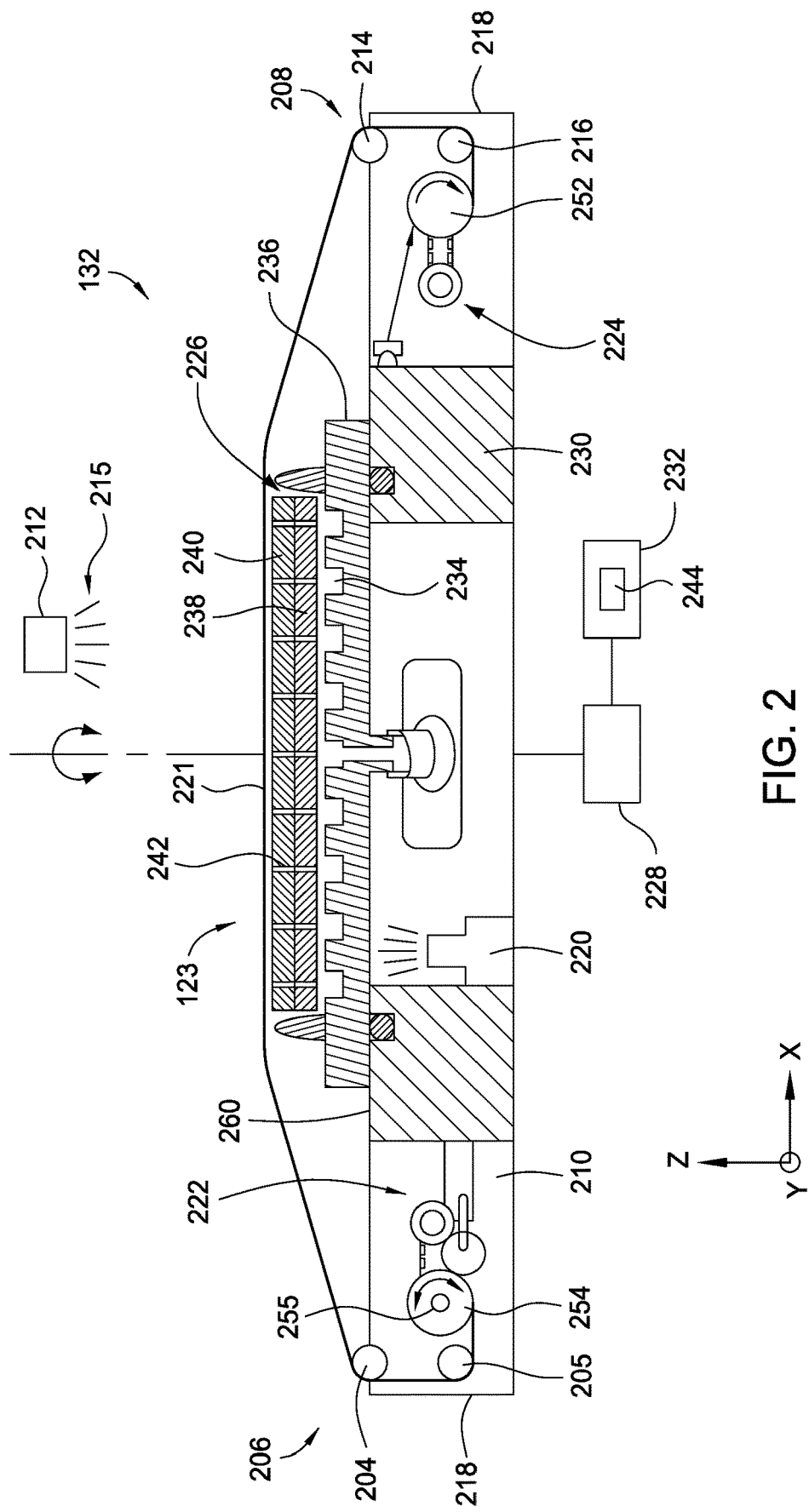
FIG. 2 is a sectional view of an exemplary processing station of the module of FIG. 1.

FIG. 2 depicts a side view of the platen assembly 132 and an exemplary supply assembly 206 and a take up assembly 208, illustrating the position of the polishing article 123 across a platen 230. Generally, the supply assembly 206 includes the supply roll 254, an upper guide member 204 and a lower guide member 205 that are disposed between a side wall 218 of the platen assembly 132. The polishing article 123 may be wound about a rod 255, which may be a tubular member or a dowel. Generally, the take-up assembly 208 includes the take-up roll 252, an upper guide member 214 and a lower guide member 216 that are all disposed between the sidewalls 218. The take-up roll 252 generally contains a used portion of polishing article 123 and is configured so that it may easily be replaced with an empty take-up roll 252 once take-up roll 252 is filled with used polishing article 123. The upper guide member 214 is positioned to lead the polishing article 123 from the platen 230 to the lower guide member 216. The lower guide member 216 leads the polishing article 123 onto the take-up roll 252. The platen assembly 132 may also comprise an optical sensing device 220, such as a laser, adapted to transmit and receive optical signals for detecting an endpoint to the planarizing or polishing process performed on a substrate.

The supply roll 254 generally contains an unused portion of polishing article 123 and is configured so that it may easily be replaced with another supply roll 254 containing a new polishing article 123 once the polishing article 123 disposed on the supply roll 254 has been consumed by the polishing or planarizing process. In some embodiments, an energy source 212 may be positioned to apply electromagnetic energy 215 toward an upper surface 221 of the polishing article 123 that is disposed between the supply roll 254 and the take-up roll 252. The electromagnetic energy 215 may be in the form of a beam or a flood of energy and may be used to selectively interact (i.e., ablate and/or heat) with discrete regions of the upper surface 221 of the polishing article 123. The electromagnetic energy 215 may be an electron beam or beams, a laser beam or beams, and combinations thereof. The electromagnetic energy 215 may be used to condition the upper surface 221 of the polishing article 123 before, during or after a polishing process. In some embodiments, the electromagnetic energy 215 is utilized to condition the upper surface 221 of the polishing article 123 during polishing in order to tune the polishing process.

The upper surface 221 of the polishing article 123 is generally configured to controllably advance the polishing article 123 in the X direction across a backing pad assembly 226. The polishing article 123 is generally moved in relation to the platen 230 by balancing the forces between a motor 222 coupled to the supply assembly 206 and a motor 224 coupled to the take-up assembly 208. Ratchet mechanisms and/or braking systems (not shown) may be coupled to one or both of the supply assembly 206 and the take-up assembly 208 to fix the polishing article 123 relative to the backing pad assembly 226. The platen 230 may be operably coupled to a rotary actuator 228 that rotates the platen assembly 132 about a rotational axis generally orthogonal to the X and/or Y directions. A vacuum system 232 may be coupled between the actuator 228 and the backing pad assembly 226. The vacuum system 232 may be used to fix the position of the polishing article 123 onto the platen 230. The vacuum system 232 may include channels 234 formed in a plate 236 disposed below the backing pad assembly 226. The backing pad assembly 226 may include a sub-pad 238 and a subplate 240, each having openings 242 formed therethrough that are in fluid communication with the channels 234 and a vacuum source 244. The sub-pad 238 is typically a plastic, such as polycarbonate or foamed polyurethane. Generally, the hardness or durometer of the sub-pad 238 may be chosen to produce a particular polishing result. The sub-pad 238 generally maintains the upper surface 221 of the polishing article 123 in a plane that is parallel to the plane of a substrate (not shown) in order to promote global planarization of the substrate. The subplate 240 is positioned between the sub-pad 238 and the bottom of the platen 230 such that the upper surface of the sub-pad 238 is maintained generally parallel to a top surface 260 of the platen 230.

Figure 3A:
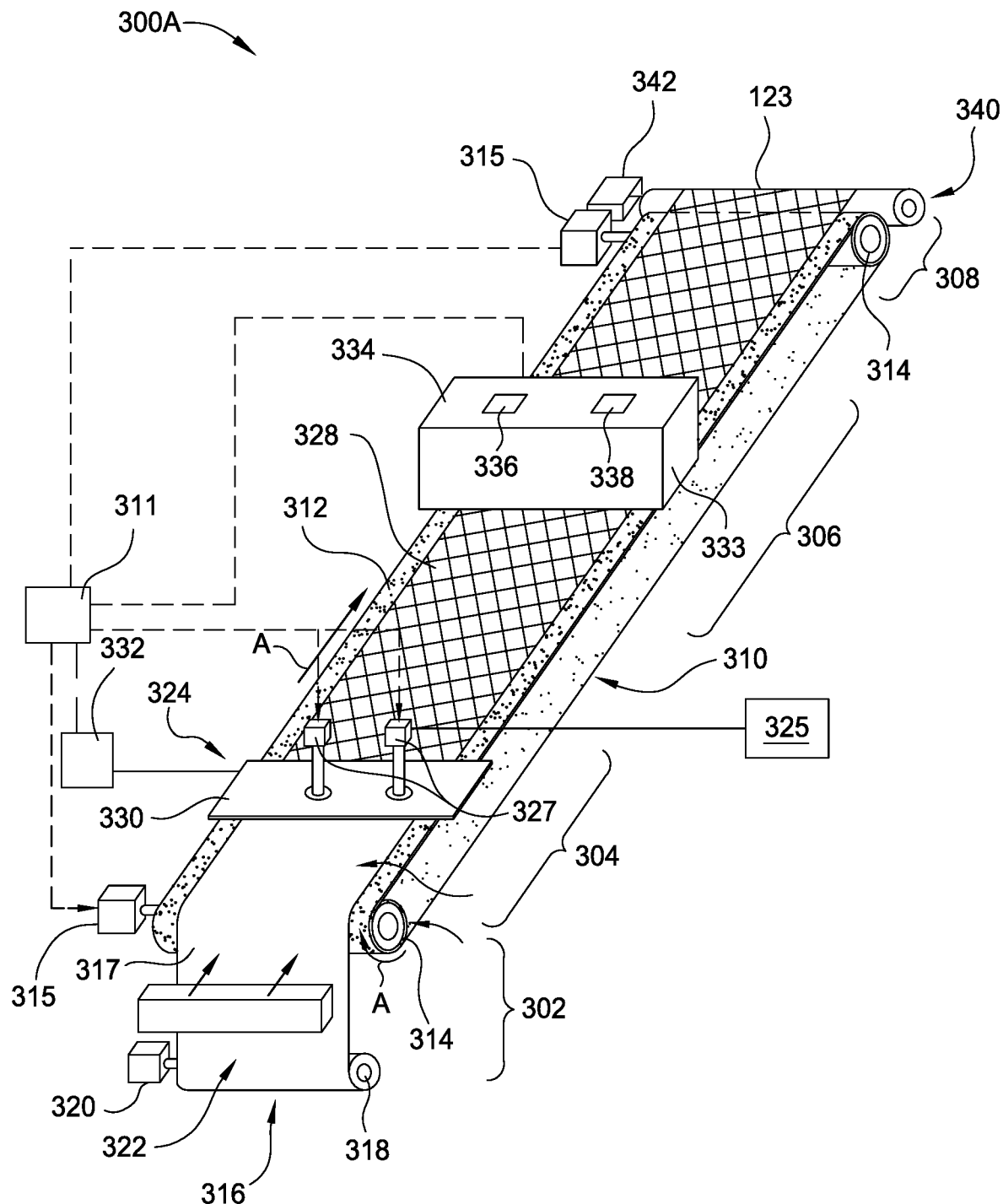
FIG. 3A is a schematic isometric view of one embodiment of a roll-to-roll pad manufacturing system.

FIG. 3A is a schematic isometric view of one embodiment of a pad manufacturing system 300A for preparing a polishing article 123 that may be used on the platen assembly 132 of FIG. 2. In one embodiment, the pad manufacturing system 300A generally includes a feed section 302, a print section 304, a curing section 306 and a pad wind-up section 308. The pad manufacturing system 300A also includes a conveyor 310 including a web 312 disposed between at least two rollers 314. One or both of the rollers 314 may be coupled to a drive motor 315 that rotates the rollers 314 and/or the web 312 in the direction depicted by the arrow indicated as A. The feed section 302, the print section 304, the curing section 306 and the pad wind-up section 308 may be operably coupled to a controller 311. The conveyor 310 may be operated to move continuously or intermittently by the controller 311.

The feed section 302 may include a supply roll 316 that is operably coupled to the conveyor 310. The supply roll 316 may be a backing material 317, such a polymeric material, for example, a biaxially-oriented polyethylene terephthalate (BoPET) material. The supply roll 316 may be disposed on a feed roller 318 that is driven or controlled by a motion control device 320. The motion control device 320 may be a motor and/or include a brake system that provides a predetermined tension on the supply roll 316 such that the unwinding speed of the supply roll 316 is driven by the drive motor 315 and/or the web 312. The feed section 302 may also include a pretreatment device 322. The pretreatment device 322 may be configured to spray or otherwise provide a coating onto the backing material 317 prior to printing at the print section 304. In some embodiments, the pretreatment device 322 may be utilized to heat the backing material 317 prior to printing at the print section 304.

The print section 304 includes a 3D printing station 324 disposed downstream of the feed section 302. The print section 304 utilizes one or more print heads 327 to provide a patterned surface 328 onto the backing material 317. The print section 304 may include a movable platform 330 that is coupled to a motion control device 332 that may be utilized to move the print heads 327 relative to the backing material 317 and the web 312.

The print heads 327 may be coupled to a material source 325 having print materials that may be used to form the patterned surface 328. Print materials may include polymeric materials such as polyurethanes, polycarbonates, fluoropolymers, PTFE, PTFA, polyphenylene sulfide (PPS), or combinations thereof. Examples also include polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes and combinations thereof.

In one embodiment, a polymeric material may be deposited as a base material on the backing material 317. The polymeric material formed may comprise an open-pored or closed-pored polyurethane material, and may include nano-scale particles interspersed therein. The particles may include organic nanoparticles. In one embodiment, the nanoparticles may include molecular or elemental rings and/or nanostructures. Examples include allotropes of carbon (C), such as carbon nanotubes and other structures, molecular carbon rings having 5 bonds (pentagonal), 6 bonds (hexagonal), or more than 6 bonds. Other examples include fullerene-like supramolecules. In another embodiment, the nano-scale particles may be a ceramic material, alumina, glass (e.g., silicon dioxide ($SiO_2$)), and combinations or derivatives thereof. In another embodiment, the nano-scale particles may include metal oxides, such as titanium (IV) oxide or titanium dioxide ($TiO_2$), zirconium (IV) oxide or zirconium dioxide ($ZrO_2$), combinations thereof and derivatives thereof, among other oxides.

The patterned surface 328 formed by the print heads 327 may comprise a composite base material, such as a polymeric matrix, which may be formed from urethanes, melamines, polyesters, polysulfones, polyvinyl acetates, fluorinated hydrocarbons, and the like, and mixtures, copolymers and grafts thereof. In one embodiment, the polymeric matrix comprises a urethane polymer that may be formed from a polyether-based liquid urethane. The liquid urethane may be reactive with a polyfunctional amine, diamine, triamine or polyfunctional hydroxyl compound or mixed functionality compounds, such as hydroxyl/amines in urethane/urea cross-linked compositions that form urea links and a cross-linked polymer network when cured.

The curing section 306 includes a curing device 333 that may be disposed in or on a housing 334. The housing 334 is disposed over the web 312 such that the web 312 and the patterned surface 328 on the backing material 317 may pass thereunder. The curing device 333 may be a thermal oven, an ultraviolet (UV) light emitter, or combinations thereof. In one embodiment, the curing device 333 may include one or both of a laser source 336 and an electron beam emitter 338 that may be used to cure the material deposited by the print heads 327 forming the patterned surface 328. In some embodiments, when the electron beam emitter is utilized, the pad manufacturing system 300A may be positioned in an enclosure where the pressure can be controlled. The laser source 336 and the electron beam emitter 338 may be utilized alone or in combination with the thermal or UV energy. In some embodiments, the laser source 336 and the electron beam emitter 338 may be used in a spot curing process where specific portions of the patterned surface 328 are targeted. The spot targeting by the laser source 336 or the electron beam emitter 338 may heat discrete regions of the patterned surface 328 to create a surface of the discrete regions that may be harder or less compressible than the surrounding portions. The laser source 336 may also be used to ablate portions of the patterned surface 328 to create a fine texture thereon.

The pad wind-up section 308 includes a take-up roll 340 where the polishing article 123 may be wound. The take-up roll 340 may be removed from the pad manufacturing system 300A to be utilized as the supply roll 254 in the platen assembly 132 of FIG. 2. During manufacturing, the take-up roll 340 may be coupled to a motion control device 342. The motion control device 342 may be a motor and/or include a brake system that controls the winding speed of the take-up roll 340.

Figure 3B:
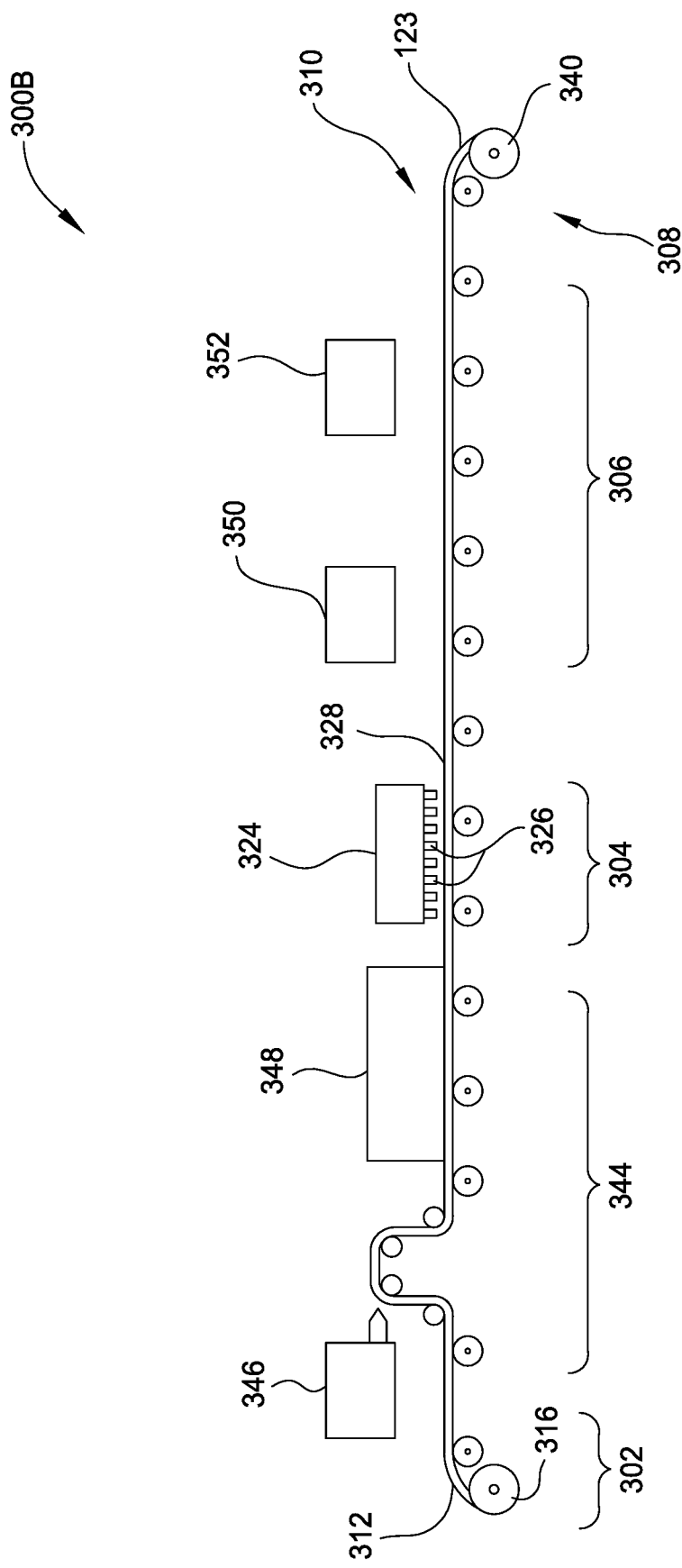
FIG. 3B is a schematic side view of another embodiment of a roll-to-roll pad manufacturing system.

FIG. 3B is a schematic side view of another embodiment of a pad manufacturing system 300B. The pad manufacturing system 300B includes the conveyor 310 having the feed section 302, the print section 304, the curing section 306 and the pad wind-up section 308 that may be similar to the pad manufacturing system 300A of FIG. 3A. However, the pad manufacturing system 300B includes a supply roll 316 that controllably unwinds a web 312 that moves over the conveyor 310 to the take-up roll 340. The web 312 may be a backing material similar to the backing material 317 described in FIG. 3A. Motion of the web 312 as well as the conveyor 310 and the take-up roll 340 may be controlled by motion control devices and a controller similar to the pad manufacturing system 300A described in FIG. 3A and the description is omitted in FIG. 3B for brevity.

The pad manufacturing system 300B includes an optional pretreatment section 344 positioned between the feed section 302 and the print section 304. The pretreatment section 344 may be used to form an adhesive or release layer onto the web 312. Alternatively, an adhesive or release layer may be formed at the print section 304 using the 3D printing station 324. When the pretreatment section 344 is used, a slot/die coater 346 may be used to deposit a layer or layers onto the web 312. Additionally, a curing station 348, utilizing UV light or heating elements, may be used to cure material deposited by the slot/die coater 346.

In this embodiment, the 3D printing station 324 comprises an array of print heads 327. The print heads 327 may be used to optionally form an adhesive or release layer on the web 312 as well as to form the patterned surface 328 on the web 312. In one example, multiple rows and columns of print heads 327 may span the width of the conveyor 310 and a portion of the length of the conveyor 310. In some embodiments, one or more of the print heads 327 may be movable relative to the conveyor 310. The print heads 327 would be coupled to the material source 325 as described in FIG. 3A.

The curing section 306 may include one or both of an optional electromagnetic energy source 350 and a thermal curing device 352. The electromagnetic energy source 350 may be one or a combination of a laser source or an electron beam emitter as described in FIG. 3A. The thermal curing device 352 may be an oven or a UV light array.

The pad wind-up section 308 includes the take-up roll 340 where the polishing article 123 may be wound. The take-up roll 340 may be removed from the pad manufacturing system 300A to be utilized as the supply roll 254 in the platen assembly 132 of FIG. 2.

Figure 4A:
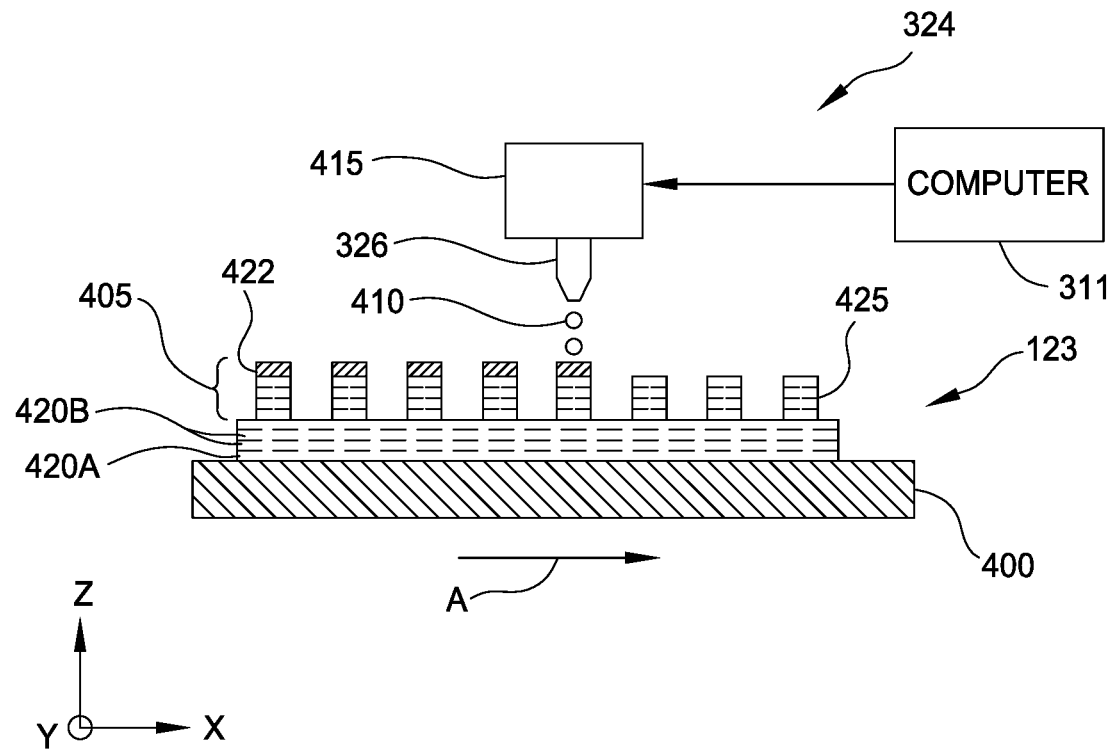
FIG. 4A is a schematic cross-sectional view of one embodiment of a 3D printing station that may be used in the pad manufacturing system of FIG. 3A or the pad manufacturing system of FIG. 3B.

FIG. 4A is a schematic cross-sectional view of one embodiment of a 3D printing station 324 that may be used in the pad manufacturing system 300A of FIG. 3A or the pad manufacturing system 300B of FIG. 3B. FIG. 4A shows a portion of one embodiment of a polishing article 123 manufactured using a 3D printing process. 3D printing offers a convenient and highly controllable process for producing polishing articles with abrasives embedded in specific locations within the polishing layer. The polishing article 123 may be printed on a support 400, which may be the backing material 317 of FIG. 3A or the web 312 of FIG. 3B.

Referring to FIG. 4A, at least a polishing layer 405 of the polishing article 123 is manufactured using a 3D printing process. In the manufacturing process, thin layers of material are progressively deposited and fused on the support 400 while the support is moved along the arrow indicated by A (in the X direction). For example, droplets 410 of pad precursor material (from the material source 325 of FIG. 3A) can be ejected from a nozzle 326 of a droplet ejecting printer 415 to form a plurality of layers 420A, 420B and 422. The layers may form a solidified material 425 comprising the pad precursor material enabling sequential deposition of other layers thereon. The droplet ejecting printer 415 may be similar to an inkjet printer, but uses the pad precursor material rather than ink. The nozzle 326 may be translated in one or both of the X and the Y direction while the support 400 is continuously or intermittently moved in the X direction during manufacturing.

In one example, a first layer 420A may be deposited by ejection of droplets 410 onto the support 400. Subsequent layers, such as layers 420B and 422 (other layers therebetween are not called out for brevity), can be deposited on the first layer 420A after solidification. After each layer is solidified, a new layer is then deposited over the previously deposited layer until the full 3-dimensional polishing layer 405 is fabricated. Solidification can be accomplished by polymerization. For example, the layers of pad precursor material can be a monomer, and the monomer can be polymerized in-situ by UV curing or thermally. The pad precursor material can be cured effectively immediately upon deposition, or an entire layer of pad precursor material can be deposited and then the layer can be cured simultaneously.

Each layer may be applied by the nozzle 326 in a pattern stored in a 3D drawing computer program that is provided on a controller 311. Each layer 420A, 420B and 422 may be less than 50% or less than the total thickness of the polishing layer 405. In one example, each layer 420A, 420B and 422 may be less than 10% of the total thickness of the polishing layer 405, for example less than 5%, such as about less than 1% of the total thickness of the polishing layer 405. In one embodiment, the thickness of each layer may include a thickness of about 30 microns to about 60 microns or less, such as on the order of nanometers (e.g., 1 to 100 nanometers), and even to picoscale dimensions (e.g., picoscale ($10^{-12}$ meters).

The support 400 can be a rigid base, or a flexible film, such as a layer of polytetrafluoroethylene (PTFE). If the support 400 is a film, then the support 400 can form a portion of the polishing article 123. For example, the support 400 can be the backing material 317 or a layer between the backing material 317 and the polishing layer 405. Alternatively, the polishing layer 405 can be removed from the support 400 and the layers 420A and 420B may form the backing layer material.

In some embodiments, abrasive particles may be dispersed in the droplets 410 of pad precursor material. The abrasive particles may be locally dispensed into polishing layer 405 during formation of each of the layers. Local dispensing of the abrasive particles may assist in minimization of agglomeration. In some embodiments, abrasive particles can be premixed with a liquid thermoset polymer precursor. Continuous agitation of the mixture of the thermoset polymer precursor and the abrasive particles prevents agglomeration of the particles, similar to apparatus used to homogenize ink pigments used in ink jet printers. In addition, the continuous agitation of the mixture ensures fairly uniform distribution of the abrasive particles in the precursor material. This can result in a more uniform distribution of particles through the polishing layer, which can lead to improved polishing uniformity and can also help avoid agglomeration.

The premixed mixture may be dispensed from a single nozzle (e.g., the nozzle 326) according to a particular pattern. For example, the premixed mixture can be uniformly dispensed to produce a homogeneous polishing layer 405 having a uniform distribution of embedded abrasive particles throughout the thickness of the polishing layer 405.

Figure 4B:
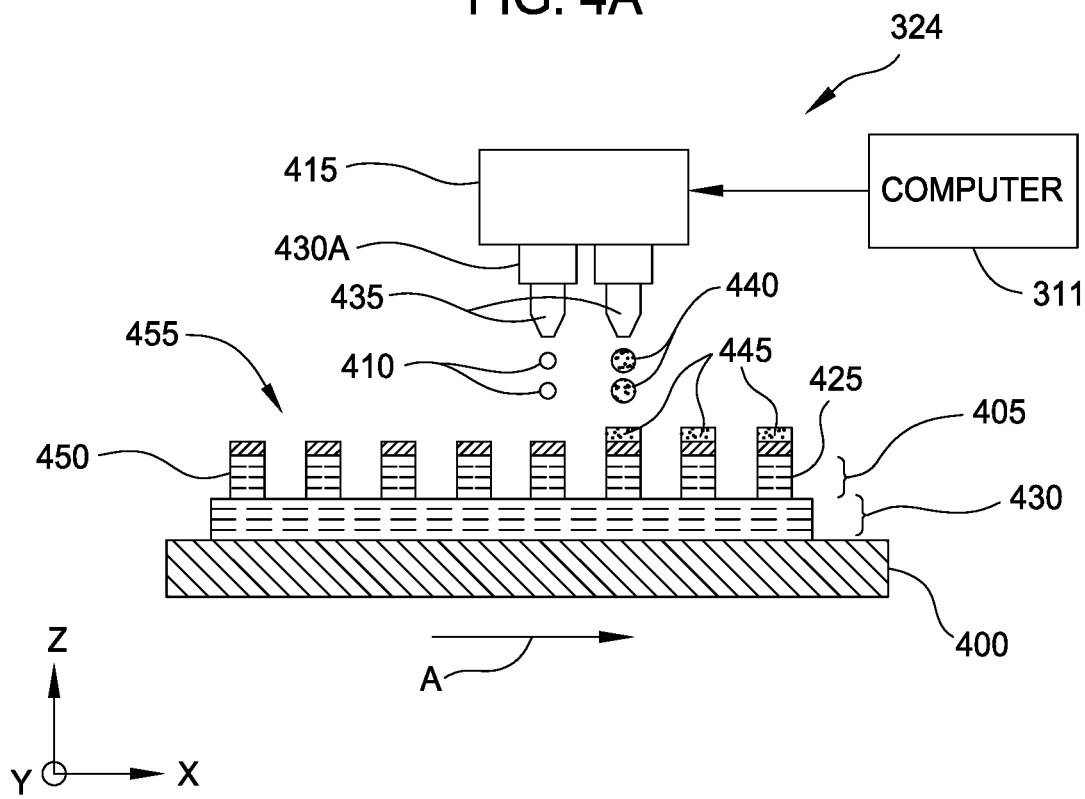
FIG. 4B is a schematic cross-sectional view of one embodiment of a 3D printing station that may be used in the pad manufacturing system of FIG. 3A or the pad manufacturing system of FIG. 3B.

FIG. 4B is a schematic cross-sectional view of one embodiment of a 3D printing station 324 that may be used in the pad manufacturing system 300A of FIG. 3A or the pad manufacturing system 300B of FIG. 3B. In FIG. 4B, a cross-sectional view of a portion of another embodiment of a polishing article 123 manufactured using a 3D printing process is illustrated. The polishing article 123 is formed by the droplet ejecting printer 415 to include a plurality of structures 450 separated by grooves 455 based on instructions from a CAD program. The structures 450 and grooves 455 may form the polishing layer 405. A sub-layer 430 may also be formed with the polishing article 123 by the droplet ejecting printer 415. The sub-layer 430 may be the backing material 317 (shown in FIG. 3A). For example, the sub-layer 430 and the polishing layer 405 could be fabricated in an uninterrupted operation by the droplet ejecting printer 415. The sub-layer 430 can be provided with a different hardness than the polishing layer 405 by using a different precursor and/or a different amount of curing, for example, a different intensity or duration of UV radiation. In other embodiments, the sub-layer 430 is fabricated by a conventional process and then secured to the polishing layer 405. For example, the polishing layer 405 can be secured to the sub-layer 430 by a thin adhesive layer such as a pressure sensitive adhesive.

In FIG. 4B, a printhead 430A having a nozzle 435, can be used to dispense a pure liquid thermoset polymer precursor, while a printhead 430B having a nozzle 435 may be used to liquid thermoset polymer precursor or a molten thermoplastic having abrasive particles 445 contained therein. The abrasive particles 445 may be dispensed only at selected locations on the polishing article 123. These selected locations collectively form the desired printing pattern of the abrasive particles and can be stored as a CAD-compatible file that is then read by an electronic controller (e.g., the controller 311) that controls the droplet ejecting printer 415. Electronic control signals are then sent to the droplet ejecting printer 415 to dispense the premixed mixture only when the nozzle 435 is translated to the position specified by the CAD-compatible file. Examples of particles 445 may include porogens such as polyethylene glycol (PEG), polyethylene oxide (PEO), hollow particles/microspheres (in sizes of about 5 nm to about 50 μm), e.g., gelatin, chitosan, $Si_3N_4$, polymethylmethacrylate (PMMA); mesoporous nanoparticles, carboxyl methyl cellulose (CMC), macroporous hydrogels and emulsion microspheres. Alternatively, a leeching technique can be employed by the combination of a salt particulate (NaCl) and PEG as co-porogens.

Alternatively, instead of using a liquid thermoset polymer precursor, the abrasive particles 445 can be premixed with a molten thermoplastic. In this embodiment, the mixture with abrasive particles 445 is also continuously agitated prior to being dispensed. After the mixture is dispensed from the droplet ejecting printer 415 according to a desired printing pattern, the molten portion of the mixture cools and solidifies, and the abrasive particles 445 are locked in place. The continuous agitation of the mixture ensures fairly uniform distribution of the abrasive particles 445 in the precursor material. This can result in a more uniform distribution of particles 445 through the polishing layer, which can lead to improved polishing uniformity and can also minimize agglomeration.

Similar to the case when liquid thermoset polymer precursor is used, the thermoplastic mixture can be uniformly dispensed to produce a uniform distribution of abrasive particles 445 across the entire polishing layer 405. Alternatively, the thermoplastic mixture containing the abrasive particles can be dispensed only at selected locations of the polishing layer 405, according to a desired printing pattern of the abrasive particles 445 that is stored as a CAD-compatible file and read by an electronic controller used to drive the droplet ejecting printer 415.

Rather than dispensing abrasive particles in a suspension from the nozzle 435 coupled to the printhead 430B, abrasive particles can be dispensed directly in powder form from the nozzle 435 of the printhead 430B, while the nozzle 435 of the printhead 430A is used to dispense the pad polymer precursor. In one embodiment, the polymer precursor is dispensed before the abrasive particles 445 are dispensed into the deposited polymer material, and the mixture is then subsequently cured.

Although 3D printing is particularly useful to construct polishing articles 123 using abrasive particles 445, for example, alumina, ceria, and others, that would be prone to agglomeration when present in conventionally constructed polishing articles, 3D printing can also be used to dispense and incorporate other polishing particles with the polishing articles 123. Thus, the abrasive particles incorporated into the polishing articles 123 can include silica, ceramic oxides, metals and hard polymers.

The droplet ejecting printer 415 can deposit particles 445 that are either solid or particles 445 that have a hollow core. The droplet ejecting printer 415 can also dispense different types of particles, some of which can undergo chemical reactions during CMP processing to produce desired changes on layer or layers of the polishing article 123 as well a chemical reactions with a substrate that is being polished. Examples of chemical reactions used in CMP processing include chemical processes that occur within the basic pH range of 10-14 that involve one or more of potassium hydroxide, ammonium hydroxide and other proprietary chemical processes used by manufactures of slurry. Chemical processes that occur within an acidic pH range of 2-5 involving organic acids such as acetic acid, citric acid are also used in CMP processing. Oxidization reactions involving hydrogen peroxide are also examples of chemical reactions used in CMP processing. Abrasive particles 445 can also be used to provide mechanically abrasive functions. The particles 445 can have sizes up to 1 millimeter, or less, such as 10 microns, or less, for example 1 micron, or less. The particles 445 can have different morphology, for example, the particles 445 can be round, elongated or faceted.

The 3D printing approach allows tight tolerances to be achieved in patterns of the polishing layer 405 and high tolerances in the distribution of abrasive particles 445 that are embedded in the polishing layer 405 due to the layer-by-layer printing approach.

Polishing Articles

FIGS. 5A and 5B depict one embodiment of a polishing article 500 that may be used on the platen assembly 132 of FIG. 2. A polishing surface 505 of the polishing article 500 comprises a plurality of strips or tiles 532 forming the patterned surface 328 of FIGS. 3A and 3B. The tiles 532 are separated by grooves 530 formed in or through a polishing material 570. The polishing material 570 may be adhered to a carrier film, such as a backing material 522. In one embodiment, at least the polishing surface 505 may be manufactured by a 3D printing process as described in FIGS. 3A-4B. The polishing surface 505 may be bound to the backing material 522 by a suitable adhesive 319 that is chosen for resistance to chemical and physical elements used in CMP processes. In some embodiments, one or both of the backing material 522 and the adhesive 319 may be manufactured by a 3D printing process as described in FIGS. 3A-4B.

Each of the plurality of tiles 532 may be connected to another tile 532 by forming the grooves 530 in the polishing material 570 to a depth that is less than the thickness of the polishing material 570. The depth of the grooves 530 may be selected to allow flexibility of, while maintaining integrity in, the polishing material 570. In the embodiment depicted in FIGS. 5A and 5B, the grooves 530 and the tiles 532 are substantially parallel to the cross-machine direction, i.e., transverse to the supply and take up roll direction. The grooves 530 form channels that may enhance slurry retention and delivery to the substrate surface. The grooves 530 are also used to break the surface tension of the polishing material 570, which may be add pliability to facilitate rolling of the polishing article 500 off of a supply roll and onto a take up roll.

In the embodiment shown in FIG. 5A, the tiles 532 are substantially rectangular and are substantially the length of a cross-machine width of the backing material 522. Other embodiments are contemplated, such as two substantially rectangular tiles 532 formed in a length substantially half of a cross-machine width of the backing material 522. In one embodiment, the tiles 532 may be formed such that the polishing article 500 is manufactured with a light or electromagnetic radiation transparent portion 536. The transparent portion 536 may be formed along the length (in the machine direction) of the polishing article 500. The backing material 522, which is also transparent to light or electromagnetic radiation emitted by an optical sensing device 220 (shown in FIG. 2), may be used to facilitate endpoint detection. The width, i.e., the dimension substantially perpendicular to the length, of the tiles 532 may be formed to any dimension. As one example, the tiles 532 may have a width of about 1 inch, or less.

In some embodiments, the polishing material 570 comprises a composite material such as a first material 515 disposed within a second material 520. The second material 520 may be a polymer matrix and the first material 515 may be microelements that are mixed in the first material 515 in one embodiment. The microelements may be a polymeric material, a metallic material, a ceramic material, or combinations thereof. The mean diameter of at least a portion of the microelements may be about 10 nanometers, although a diameter greater than or less than 10 nanometers may be used. The mean diameter of the microelements may be substantially the same or may be varied, having different sizes or mixtures of different sizes, and may be impregnated in the polymeric matrix, as desired. Each of the microelements may be spaced apart at a mean distance of about 0.1 micron to about 100 microns. The microelements may be substantially uniformly distributed throughout the polymeric base material.

The first material 515 may have a different reactivity with electromagnetic energy, such as a beam or beams of energy from the energy source 212 (shown in FIG. 2) when compared with the second material 520. The different reactivity may be used to form a micro texture on the polishing surface 505. The different reactivity between the first material 515 and the second material 520 may provide that the first material 515 will be ablated at a greater rate that the second material 520, or vice versa. The polymer microelements may be micron sized or nano sized materials that form micron sized or nano sized domains within the polishing surface 505 of the polishing article 500. Each of the microelements may include a mean diameter which is less than about 150 microns to about 10 microns, or less.

FIGS. 6A and 6B depict another embodiment of the polishing article 600 that may be used on the platen assembly 132 of FIG. 2. The polishing article 600 has a polishing surface 605 forming the patterned surface 328 of FIGS. 3A and 3B. The polishing surface 605 comprises a plurality of strips or tiles 632 separated by adjacent transverse grooves 630 formed in or through a polishing material 670 and adhered to a backing material 522. In this embodiment, the polishing material 570 includes a plurality of particles 445, as described in FIG. 4B, intermixed therein. Each of the plurality of strips or tiles 632 may be connected to each other by forming each of the grooves 630 in the polishing material 670 to a depth that is less than the thickness of the polishing material 670. The depth of the grooves 630 may be selected to allow flexibility in, while maintaining integrity of, the polishing material 670. Alternatively, the polishing material 670 may exhibit a modulus of elasticity or other mechanical attributes to facilitate movement in a roll format that obviates the need for the backing material 522. In this embodiment, the plurality of tiles 432 may be formed by the plurality of grooves and used in a roll format without an adhesive 319 and the backing material 522. As another alternative, the polishing material 570 may be formed such that the grooves 630 form a tile 632 that is separate or discrete, and is bound to the backing material 522 by a suitable adhesive 519. In the embodiment depicted, the polishing article 600 has corresponding lateral grooves 635, which are added to aid in slurry retention and delivery to the substrate, and to enhance flexibility of the polishing article 600.

The tiles 632 may be any shape and dimension to facilitate efficient polishing. In one embodiment, the tiles 632 may be formed such that the polishing article 600 is manufactured with a light or electromagnetic radiation transparent portion 636. The transparent portion 636 may be formed along the length (in the machine direction) of the polishing article 600. The backing material 522, which is also transparent to light or electromagnetic radiation emitted by an optical sensing device 220 (FIG. 2), may be used to facilitate endpoint detection.

FIGS. 7A and 7B depict another embodiment of a polishing article 700 that may be used on the platen assembly 132 of FIG. 2. The polishing article 700 has a polishing surface 705 forming the patterned surface 328 of FIGS. 3A and 3B. The polishing surface 705 includes a plurality of pores 732 formed in the polishing material 570. The polishing material 570 may be bound to the backing material 522 by a suitable adhesive 519 that is chosen for resistance to chemical and physical elements used in CMP processes. The pores 732 in the polishing article 123 are substantially circular or oval shapes, but may comprise other annular geometric shapes, such as a cone or hollow frustum i.e., a cone between substantially parallel planes. As in other embodiments, a lateral portion 736 may be transparent to allow monitoring of a substrate by an optical sensing device 220 (FIG. 2).

In one embodiment, the pores 732 may be hollow (i.e., empty space) that are sized and/or spaced to enhance slurry retention and aid in rolling of the polishing article 700. In other embodiments, the pores 732 may be filled at least partially with a first material 710 that is different that the polishing material 570 (a second material 712). The first material 710 may be a polymer material that has a different reactivity to a curing method as compared to the second material 712. For example, the second material 712 may be curable with UV energy while the first material 710 is not significantly affected by UV energy. However, the first material 710 may be cured thermally in one embodiment. In one embodiment, the polishing article 700 may be differentially cured using the first material 710 and the second material 712. In one example of differential curing, the first material 710 and the second material 712 of the polishing article 700 may be cured with UV energy that does not cure the first material 710. This may make the second material 712 harder than the first material 710 which may add compressibility and/or flexibility to the polishing article 700 as the first material 710 in more viscous than the second material 712.

In one embodiment, the first material 710 is thermally cured to make the pores 732 having the first material 710 therein harder, but softer and more compressible than the second material 712. In another embodiment, the first material 710 in the pores 732 is cured thermally by heat produced by friction during a substrate polishing process. In this embodiment, the first material 710 may be cured to be harder than the second material 712 thus forming domains on the polishing surface 705 that are harder than the surrounding second material 712.

In other embodiments, the first material 710 may have a different reactivity with electromagnetic energy, such as a beam or beams of energy from the energy source 212 (shown in FIG. 2) when compared with the second material 712. The different reactivity may be used to form a micro texture on the polishing surface 705. The different reactivity between the first material 710 and the second material 712 may provide that the first material 710 will be ablated at a greater rate than the second material 712, or vice versa. The pores 732 may be micron sized or nano sized materials that form micron sized or nano sized domains within the polishing surface 705 of the polishing article 700. In one embodiment, the pores 732 may include a mean diameter which is less than about 150 microns to about 10 microns, or less.

In the above embodiments of the polishing articles 123, 500, 600 or 700, the backing material 317 or 522 is a plastic material, such as a polyester film, for example biaxially-oriented polyethylene terephthalate or polyethylene terephthalate material, that may be formed by a 3D printing process or as a base material in a 3D printing process. The backing material 317 or 522 may be provided at a thickness of about 0.002 inches (50.8 µm) to about 0.012 inches (304.8 µm), for example, about 0.004 inches (101.6 µm). The patterned surface 328 and the polishing material 570, 670 or 770 may be a polymeric material with a hardness in a range of about 20-80 on the Shore D scale. In a one embodiment, the thickness of the polishing article 123 is between about 0.019 inches (482.6 µm) to about 0.060 inches (1,524 µm).

Figure 8:
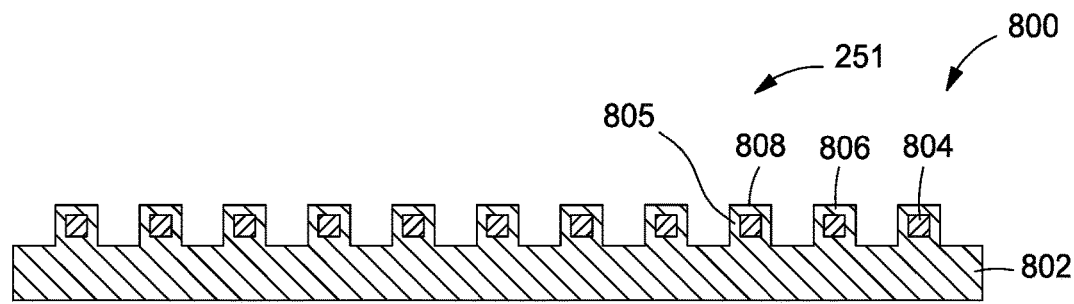
FIG. 8 is a schematic perspective sectional view of a polishing article according to another embodiment of the present disclosure.

FIG. 8 is a schematic perspective sectional view of a polishing article 800 that may be used as the polishing article 123 on the platen assembly 132 of FIG. 2. The polishing article 800 includes a composite pad body 802 which may be a base material layer formed from a soft material intermixed with hard features 804. The composite pad body 802 may be formed by 3D printing. A plurality of raised features 806 may include one or more layers of soft material 805 at least partially surrounding the hard features 804. In one embodiment, the hard features 804 may have a hardness of about 40 Shore D scale to about 90 Shore D scale. The soft material 805 as well as the remainder of the composite pad body 802 may have a hardness value between about 26 Shore A scale to about 95 Shore A scale.

The composite pad body 802 includes plurality of layers, each layer including regions of a first material for the soft material 805 and regions of a second material for the hard features 804 that may be deposited by a 3D printer. The plurality of layers may then be cured, for example by UV light, by a heat source, or electromagnetic energy to solidify and achieve a desired hardness. After deposition and curing, the hard features 804 and the soft material 805 are joined together to form a unitary composite pad body 802.

The soft material 805 may be formed from the first material having a lower hardness value and a lower value of Young's modulus while the hard features 804 may be formed from the second material having a higher hardness value and a higher value of Young's modulus.

The hard features 804 may be formed from a polymer material, for example, polyurethane, acrylate, epoxy, acrylonitrile butadiene styrene (ABS), polyetherimide, polyamides, melamines, polyesters, polysulfones, polyvinyl acetates, fluorinated hydrocarbons, and the like, and mixtures, copolymers and grafts thereof. In one embodiment, the hard feature may be formed from a simulating plastic 3D printing material such as polyether ketones (PEEK), polyphenylsulfone (PPS), polyoxymethylene (POM), and the like. The hard feature may also be provided by precursor materials and/or urethanes can be engineered to be the hard features. In one embodiment, abrasive particles may be embedded in the hard features 604 to enhance polishing. The abrasive particles may be a metal oxide, such as ceria, alumina, silica, or a combination thereof, polymeric, intermetallic or ceramics.

The soft material 805 may be formed from an elastomer material, for example, elastomeric polyurethanes. In one embodiment, the soft material 805 may be formed from a rubber-like 3D printing material, such as polybutadiene, isoprene, chloroprene, EPDM, and the like. The elastic feature may also be provided by precursor materials and/or urethanes can be engineered to be rubbery to provide the elastic features.

In one embodiment, the raised features 806 may in a linear pattern, a rectangular pattern of be in a concentric ring or a line pattern. Grooves 818 are formed between the raised features 806. During polishing, the upper surfaces 808 of the raised features 806 form a patterned surface 251 that contacts the substrate, while the grooves 818 retains polishing fluid.

In one embodiment, a width of the raised features 806 may be about 250 microns to about 2 millimeters. A pitch between the raised features 806 may be about 0.5 millimeters to about 5 millimeters. Each raised feature 806 may have a width of about 250 microns to about 2 millimeters and may include the same pitch, or the width and/or the pitch may vary across a radius of the polishing article 800 to provide zones of varied hardness.

Compared with other polishing articles, the composite polishing article 800 of the present disclosure has several advantages. Traditional polishing articles generally include a polishing layer with a textured polishing surface and/or an abrasive materials supported by a sub pad formed from a soft material, such as a foam, to obtain desired hardness or Young's modulus for polishing substrates. By selecting materials of various Young's modules, adjusting dimensions of the features or varying arrangements of the different features with the use of 3D printing, a desirable hardness or Young's modulus may be achieved in the composite pad body 802 without using a sub pad. Therefore, the polishing article 800 reduces cost of ownership by eliminating sub pads. Additionally, hardness and abrasiveness of the polishing article 800 may be tuned by mixing features with different hardness and abrasiveness, therefore, improving polishing performance.

Composite polishing articles according to the present disclosure may have variable Young's modulus across surface features, such as the hard features 604, and base material, such as the soft material 805, by pattern variation and/or feature size variation. Young's modulus across the polishing pads may be symmetric or non-symmetric, uniform or non-uniform to achieve desired properties. Patterning of the raised features 806 may be radial, concentric, rectangular, or random according to achieve desired property.

Outer surfaces 808 of the raised features 806 are formed from a polymer material that is softer or more elastic than the hard features 804. In one embodiment, the outer surface 808 of the raised features 806 may be formed from the same material as the base material layer 802. In some embodiments, the raised features 806 include the hard feature 804 embedded therein. The embedded hard features 804 provide hardness and rigidity desired for polishing. The soft polymeric layer of the outer surface 808 may reduce defects and improve planarization on the substrate being polished. Alternatively, a soft polymer material may be printed on surfaces of other polishing pads of the present disclosure to provide the same benefit.

Figure 9:
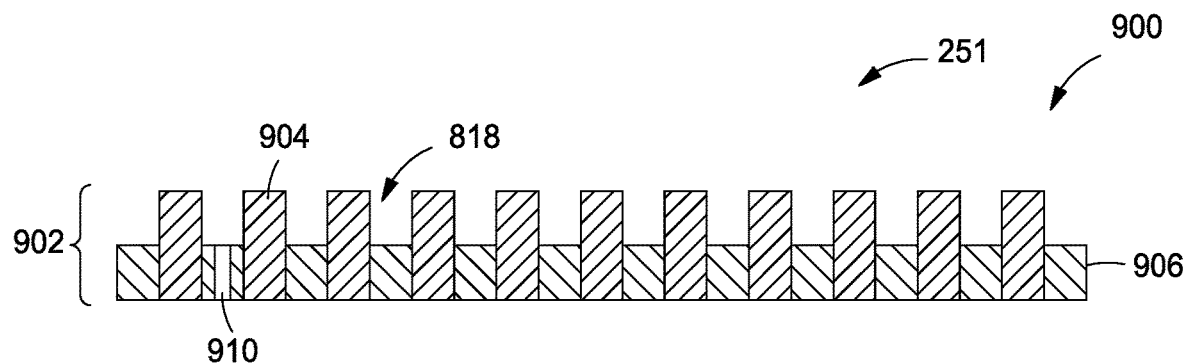
FIG. 9 is a schematic perspective sectional view of another embodiment of a polishing article having an observation window.

FIG. 9 is a schematic perspective sectional view of a polishing pad 900 having an observation window 910 similar to the electromagnetic radiation transparent portion 536 described in FIG. 5A. The polishing pad 900 may be used as the polishing article 1223 on the platen assembly 132 of FIG. 2 as well as other embodiments of polishing pads as described herein. A composite pad body 902 includes one or more hard features 904 and one or more elastic features 906. The hard features 604 and the elastic features 606 are discrete features that are joined together at boundaries to form the composite pad body 602 and may include the materials described above with the soft material 805 and the hard features 804.

The polishing pad 900 may include one or more elastic features 906 and a plurality of hard features 904 extending from the elastic features 906. In one embodiment, the hard features 904 may have a hardness of about 40 Shore D scale to about 90 Shore D scale. The elastic features 906 may have a hardness value between about 26 Shore A scale to about 95 Shore A scale. The hard features 904 may be arranged in any suitable patterns according to the present disclosure.

The observation window 910 may be formed from a transparent material to provide monitoring of a substrate being polished. The observation window 910 may be formed through the elastic feature 906 or the hard features 904. In one embodiment, the observation window 910 may be formed from a transparent 3D printing photopolymer. In one embodiment, the observation window 910 may be formed from UV transmissible polyurethane acrylates, polyester acrylates, polyether acrylates, polymethylmethacrylate (PMMA).

Figure 10:
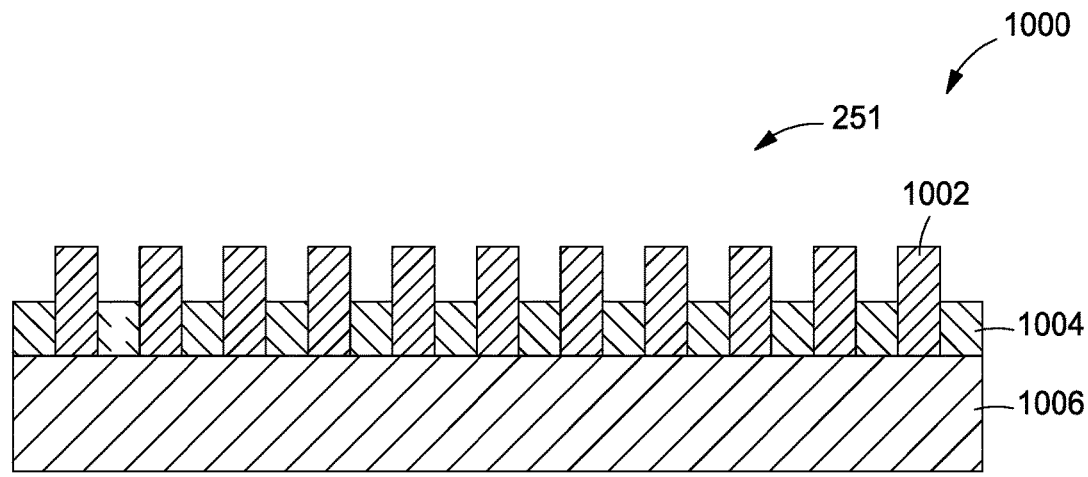
FIG. 10 is a schematic sectional view of another embodiment of a polishing article including a backing layer.

FIG. 10 is a schematic sectional view of a polishing article 600 including a backing layer 1006. The polishing pad 1000 may be used as the polishing article 1223 on the platen assembly 132 of FIG. 2 as well as other embodiments of polishing pads as described herein. The polishing pad 1000 includes a base material layer 1004 and a plurality of surface features 1002 protruding from the base material layer 1004.

The polishing pad 1000 may be similar to the polishing articles 500, 600, 700, 800 or 900 described above with the exception of having the backing layer 1006 attached to the base material layer 1004. The backing layer 1006 may provide compressibility to the polishing article 1000. The backing layer 1006 may have a hardness value of less than 80 Shore A scale, in one embodiment.

In one embodiment, the backing layer 1006 may be formed from an open-cell or a closed-cell foam, such as polyurethane or polysilicone with voids, so that under pressure, the cells collapse and the backing layer 1006 compresses. In another embodiment, the backing layer 1006 may be formed from natural rubber, ethylene propylene diene monomer (EPDM) rubber, nitrile, or polychloroprene (neoprene).

Figure 11:
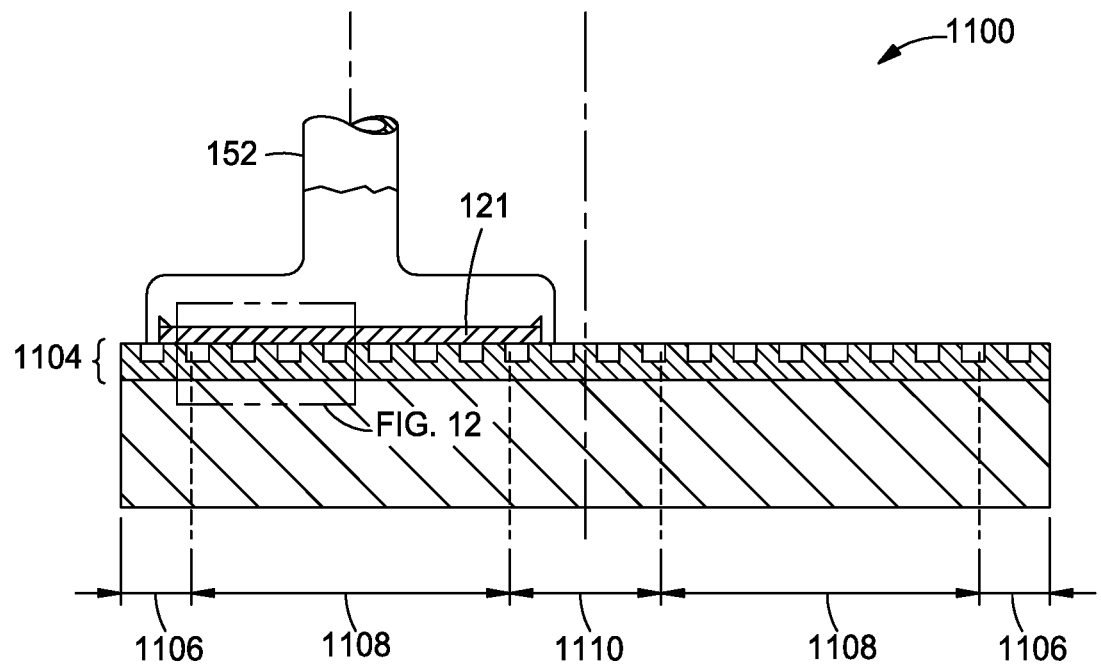
FIG. 11 is a schematic sectional view of another embodiment of a polishing article having multiple zones.

FIG. 11 is a schematic sectional view of a polishing article 1100 having multiple zones. The polishing article 1100 may be designed to have different properties in regions contacting a central area of a substrate 121 than regions contacting peripheral portions of the substrate 121 during polishing. FIG. 11 schematically illustrates the carrier head 152 positioning the substrate 121 relative to the polishing article 1100. In one embodiment, the polishing article 1100 may include a composite pad body 1102 disposed on a backing layer 1104. The composite pad body 1102 may be manufactured by a 3D printing process. As shown in FIG. 11, the polishing pad 1100 may be divided into an outer edge zone 1106, an inner edge zone 1108 along the radius thereof, and a central zone 1110. The outer edge zone 1106 and the inner edge zone 1108 contact the edge region of the substrate 114 during polishing while the central zone 1110 contacts the central region of the substrate 114 during polishing.

The polishing pad 1100 has a different modulus on the edge zones 1106, 1108 as compared to the central zone 1110, to improve edge polishing quality. In one embodiment, the edge zones 1106, 1108 may have a lower Young's modulus than the central zone 1110.

Figure 12:
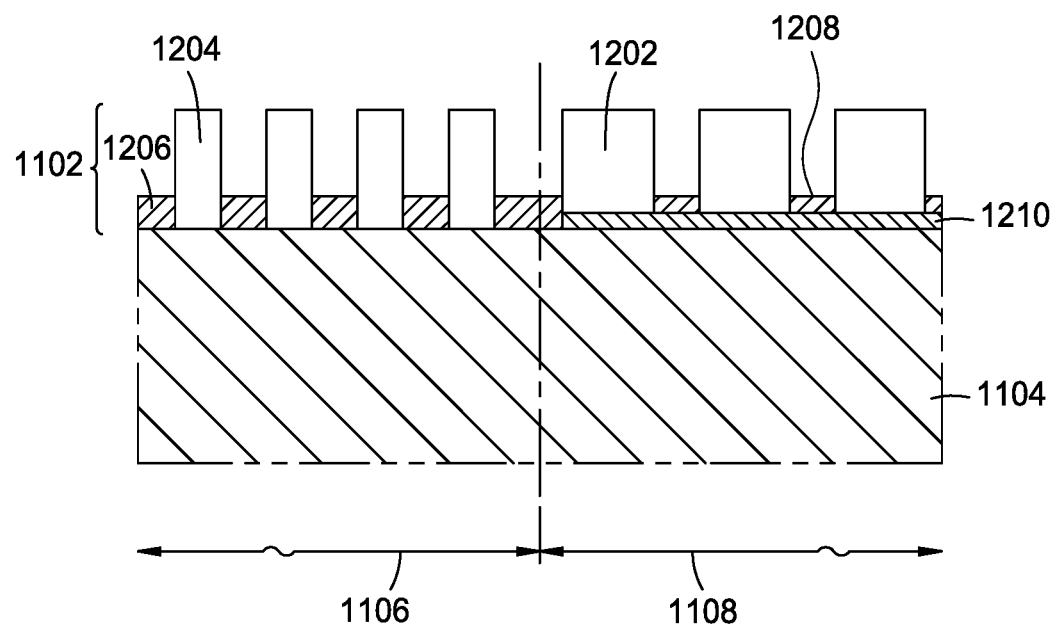
FIG. 12 is a partial enlarged sectional view of the polishing article of FIG. 11.

FIG. 12 is a partial enlarged sectional view of the polishing article 1100 of FIG. 11 showing an exemplary design for the edge zone 1106 and the inner edge zone 1108. The edge zone 1106 includes a base material layer 1206 and a plurality of surface features 1202. The surface features 1204 may be formed from materials harder than the base material layer 1206. The inner edge zone 1108 includes a base material layer 1208 and a plurality of surface features 1204. The surface features 1202 may be formed from materials harder than the base material layer 1208. In one embodiment, the central zone 1108 may include a locking layer 1210 under the base material layer 1208. The locking layer 1210 may be formed from a hard material. The plurality of surface features 1204 may be printed on the locking layer 1210 to improve stability. As shown in FIG. 12, the surface features 1202 in the inner edge zone 1108 are larger in size than the surface features 1204 in the outer edge zone 1106. In one embodiment, the pitch of the surface features 1204 in the edge zone 1106 may be less than the pitch of the surface features 1202 in the inner edge zone 1108.

While the foregoing is directed to embodiments of the present disclosure, other and further embodiments of the disclosure may be devised without departing from the basic scope thereof, and the scope thereof is determined by the claims that follow.

The invention claimed is:

1. A polishing article, comprising:
 a unitary composite pad body formed of a plurality of printer deposited layers, the unitary pad body comprising a base region and a plurality of raised features extending from the base region to form a polishing surface, wherein:
  the base region is formed of a first material,
  the plurality of raised features comprise regions of the first material and regions of a second material, wherein the regions of the second material are at least partially surrounded by the first material, and
  the regions of the second material comprise discrete regions within a cross-linked polymer matrix of the first material and the second material which forms the unitary composite pad body.

2. The polishing article of claim 1, wherein the second material has a hardness greater than a hardness of the first material.

3. The polishing article of claim 1, wherein the second material is formed of polyurethane, acrylate, epoxy, acrylonitrile butadiene styrene (ABS), polyetherimide, polyamides, melamines, polyesters, polysulfones, polyvinyl acetates, fluorinated hydrocarbons, or combinations thereof.

4. The polishing article of claim 1, wherein the regions of the second material have a hardness in a range from about 40 Shore D scale to about 90 Shore D scale.

5. The polishing article of claim 1, wherein the regions of the first material have a hardness in a range from about 26 Shore A scale to about 95 Shore A scale.

6. The polishing article of claim 1, wherein a Young's modulus of the regions of the second material is greater than a Young's modulus of the regions of the first material.

7. The polishing article of claim 1, wherein the second material comprises a gel.

8. The polishing article of claim 1, wherein the second material comprises polyethylene glycol (PEG).

9. The polishing article of claim 1, wherein the second material comprises polyethylene oxide (PEO), hydrogel, polymethylmethacrylate (PMMA), or carboxyl methyl cellulose (CMC).

10. A polishing article, comprising:
 a base material layer and a plurality of raised features extending from the base material layer to form a unitary pad body, wherein:
  the base material layer is formed of a first plurality of sequentially deposited layers comprising a first material,
  the plurality of raised features are formed of a second plurality of sequentially deposited layers comprising the first material and discrete regions of a second material at least partially surrounded by the first material, and
  the regions of the second material form a cross-linked polymer matrix with the first material at interfacial boundaries thereof.

11. The polishing article of claim 10, wherein the second material is formed of polyurethane, acrylate, epoxy, acrylonitrile butadiene styrene (ABS), polyetherimide, polyamides, melamines, polyesters, polysulfones, polyvinyl acetates, fluorinated hydrocarbons, or combinations thereof.

12. The polishing article of claim 10, wherein the regions of the second material have a hardness in a range from about 40 Shore D scale to about 90 Shore D scale.

13. The polishing article of claim 10, wherein regions of the first material have a hardness in a range from about 26 Shore A scale to about 95 Shore A scale.

14. The polishing article of claim 10, wherein the discrete regions of the second material form a non-random pattern within the plurality of raised features.

15. The polishing article of claim 14, wherein the second material comprises a gel.

16. A polishing pad, comprising:
a plurality of raised features extending upward from a base material layer, wherein:
the base material layer and the plurality of raised features are each formed of pluralities of sequentially deposited layers to collectively comprise a unitary pad body,
the base material layer comprises a first material,
the plurality of raised features comprise the first material and a second material,
the second material is disposed in a plurality of discrete regions at least partially surrounded by the first material, and
the second material is joined to the first material to form a polymer matrix at boundaries thereof.

17. The polishing pad of claim 16, wherein:
the plurality of discrete regions of the second material have a hardness in a range from about 40 Shore D scale to about 90 Shore D scale, and
regions of the first material have a hardness in a range from about 26 Shore A scale to about 95 Shore A scale.

18. The polishing pad of claim 16, wherein:
the second material comprises an acrylate, and
the plurality of discrete regions of the second material are disposed in a non-random pattern.

* * * * *